United States Patent
Moser et al.

(10) Patent No.: US 9,656,741 B2
(45) Date of Patent: May 23, 2017

(54) CONTROL INTERFACE FOR LEADING AND TRAILING EDGE DEVICES

(71) Applicant: The Boeing Company, Chicago, IL (US)

(72) Inventors: Matthew A. Moser, Marysville, WA (US); Michael R. Finn, Kirkland, WA (US); Adam Thoreen, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 14/035,048

(22) Filed: Sep. 24, 2013

(65) Prior Publication Data
US 2015/0105945 A1    Apr. 16, 2015

(51) Int. Cl.
| B64C 13/16 | (2006.01) |
| B64C 9/28 | (2006.01) |
| B64C 13/04 | (2006.01) |

(52) U.S. Cl.
CPC ........... *B64C 13/16* (2013.01); *B64C 9/28* (2013.01); *B64C 13/04* (2013.01); *Y02T 50/32* (2013.01)

(58) Field of Classification Search
USPC .......................................................... 701/33
See application file for complete search history.

(56) References Cited

U.S. PATENT DOCUMENTS

| 2,350,751 | A |   | 6/1944 | Carlo et al. |
| 3,575,363 | A | * | 4/1971 | Jenny ................. B64C 9/00 244/13 |
| 3,822,047 | A |   | 7/1974 | Schuldt, Jr. |
| 3,884,435 | A | * | 5/1975 | Croy ................... B64C 5/14 244/46 |
| 4,106,730 | A |   | 8/1978 | Spitzer et al. |
| 4,725,026 | A |   | 2/1988 | Krafka et al. |
| 4,729,528 | A |   | 3/1988 | Borzachillo |
| 4,821,981 | A |   | 4/1989 | Gangsaas et al. |
| 4,838,503 | A |   | 6/1989 | Williams |

(Continued)

FOREIGN PATENT DOCUMENTS

| EP | 0193442 | 9/1986 |
| EP | 0291328 | 1/1991 |

(Continued)

OTHER PUBLICATIONS

European Search Report for 14185978.5, dated Feb. 4, 2015.
(Continued)

*Primary Examiner* — Jean-Paul Cass

(57) ABSTRACT

A system for controlling a high-lift device of an aircraft may include an interface for placement in a flight deck of an aircraft. The interface may include an edge control device for controlling a position of the high-lift device. The interface may be operable to select any of a plurality of control device positions. Each one of the plurality of control device positions may correspond to a different flight phase of the aircraft. The edge control device may be operable to engage, in response to a selection of a first control device position, a command mode for actuating the high-lift device in an automated manner based on the flight phase associated with the first control device position.

19 Claims, 21 Drawing Sheets

(56) References Cited

U.S. PATENT DOCUMENTS

| | | | | |
|---|---|---|---|---|
| 5,056,741 | A | * | 10/1991 | Bliesner ............... B64C 9/24 244/210 |
| 5,803,408 | A | | 9/1998 | Gast |
| 5,839,699 | A | | 11/1998 | Bliesner |
| 5,927,656 | A | | 7/1999 | Hinkleman |
| 5,940,013 | A | * | 8/1999 | Vladimir ............... B64D 43/00 340/945 |
| 6,152,405 | A | | 11/2000 | Muller |
| 6,271,769 | B1 | * | 8/2001 | Frantz ................ G01P 13/025 340/963 |
| 6,913,228 | B2 | * | 7/2005 | Lee ..................... B64C 30/00 244/135 C |
| 7,048,234 | B2 | * | 5/2006 | Recksiek ............ B64C 13/503 244/213 |
| 7,366,592 | B2 | * | 4/2008 | Delaplace ........... G05D 1/0066 244/75.1 |
| 7,458,543 | B2 | * | 12/2008 | Cutler ................ B64D 39/00 244/135 A |
| 7,494,094 | B2 | | 2/2009 | Good |
| 7,556,224 | B2 | * | 7/2009 | Johnson .............. B64C 13/50 244/175 |
| 7,591,277 | B2 | * | 9/2009 | Johnson .............. B64C 17/10 137/1 |
| 7,641,152 | B2 | | 1/2010 | Onu et al. |
| 7,720,579 | B2 | | 5/2010 | Goodman |
| 7,726,610 | B2 | | 6/2010 | Good et al. |
| 7,792,615 | B2 | | 9/2010 | Aimar |
| 7,878,449 | B2 | * | 2/2011 | Heaven, Jr. ............. B64B 1/70 244/93 |
| 7,954,766 | B2 | * | 6/2011 | Brainard ................ B64D 1/22 244/194 |
| 8,172,182 | B2 | * | 5/2012 | Tanner ................ B64C 3/34 244/135 B |
| 8,226,040 | B2 | * | 7/2012 | Neto ................... B64C 17/10 244/135 C |
| 8,231,082 | B2 | * | 7/2012 | Delporte ............... B64C 17/10 244/135 C |
| 8,260,477 | B2 | * | 9/2012 | Almalki ................ G01C 21/16 701/3 |
| 8,276,842 | B2 | * | 10/2012 | Kracke ................. B64C 13/28 244/99.2 |
| 8,356,766 | B2 | | 1/2013 | Garthaffner |
| 8,424,810 | B1 | | 4/2013 | Shmilovich et al. |
| 8,548,721 | B2 | * | 10/2013 | Paillard ................ B64C 17/10 244/135 C |
| 8,573,937 | B2 | * | 11/2013 | Preus ................... F03D 7/0224 416/140 |
| 8,645,009 | B2 | * | 2/2014 | Klooster ............... G05D 1/0005 244/180 |
| 8,746,614 | B2 | * | 6/2014 | Heintjes ................ B64C 13/28 244/75.1 |
| 8,814,085 | B2 | * | 8/2014 | Richter ................ B64C 13/42 244/211 |
| 8,814,096 | B2 | * | 8/2014 | Spottiswoode ......... B64C 17/10 244/135 C |
| 8,903,569 | B2 | * | 12/2014 | Ruckes ................ B64C 19/00 244/10 |
| 8,954,208 | B2 | * | 2/2015 | Yamasaki .............. G01M 9/06 701/13 |
| 8,998,132 | B2 | * | 4/2015 | Burris ................. B64C 9/04 244/75.1 |
| 9,045,227 | B1 | * | 6/2015 | Gramling .............. B64C 15/02 |
| 9,073,643 | B2 | * | 7/2015 | Moy ..................... B64D 45/00 |
| 9,081,372 | B2 | * | 7/2015 | Fervel .................. B64C 13/42 |
| 9,327,827 | B2 | * | 5/2016 | Moser .................. B64C 13/16 |
| 2002/0074459 | A1 | | 6/2002 | Gleine |
| 2005/0011994 | A1 | | 1/2005 | Sakurai et al. |
| 2005/0045763 | A1 | * | 3/2005 | Morgenstern ........... B64C 9/24 244/10 |
| 2005/0116116 | A1 | * | 6/2005 | Morgenstern ........... B64C 3/16 244/214 |
| 2005/0151028 | A1 | | 7/2005 | Pohl |
| 2005/0242234 | A1 | * | 11/2005 | Mahmulyin ............ B64C 9/16 244/75.1 |
| 2006/0049308 | A1 | * | 3/2006 | Good ................... B64C 3/50 244/76 A |
| 2006/0202089 | A1 | * | 9/2006 | Reckzeh ............... B64C 9/20 244/215 |
| 2007/0262207 | A1 | * | 11/2007 | Morgenstern ........... B64C 3/16 244/214 |
| 2008/0154445 | A1 | | 6/2008 | Goodman |
| 2008/0255713 | A1 | * | 10/2008 | Onu ..................... B64C 9/12 701/3 |
| 2009/0057493 | A1 | * | 3/2009 | Sankrithi .............. B64C 3/10 244/35 R |
| 2010/0056330 | A1 | * | 3/2010 | Schuh ................... F01P 3/20 477/52 |
| 2010/0200704 | A1 | * | 8/2010 | Berens ................. B64C 9/16 244/76 A |
| 2010/0219299 | A1 | * | 9/2010 | Holzhausen ........... B64C 9/22 244/214 |
| 2011/0127385 | A1 | | 6/2011 | Morris |
| 2012/0032030 | A1 | | 2/2012 | Ruckes et al. |
| 2012/0138738 | A1 | * | 6/2012 | Vela Orge ............. B64C 5/02 244/87 |
| 2014/0263831 | A1 | * | 9/2014 | Mitchell, Jr. ........... B64C 39/04 244/1 N |
| 2015/0083851 | A1 | * | 3/2015 | Moser .................. B64C 9/32 244/99.2 |
| 2015/0088340 | A1 | * | 3/2015 | Moser .................. B64C 13/16 701/3 |
| 2015/0105945 | A1 | * | 4/2015 | Moser .................. B64C 13/04 701/3 |
| 2015/0239550 | A1 | * | 8/2015 | Berens ................. B64C 13/16 244/76 A |

FOREIGN PATENT DOCUMENTS

| | | |
|---|---|---|
| EP | 1547917 A1 | 6/2005 |
| EP | 2465770 | 6/2012 |
| FR | 2902756 | 12/2007 |
| GB | 2186849 | 8/1987 |
| WO | WO9915403 | 4/1999 |

OTHER PUBLICATIONS

Airbus, "Getting to Grips with Aircraft Performance," Jan. 2002.
Delta Virtual Airlines, "Boeing 777-200ER Aircraft Operating Manual," Nov. 2005.
The Boeing Company, "777 Flight Crew Operations Manual—Flight Controls," Dec. 15, 2003.
Boeing Flight Operations, "Landing Performance," 2009.
TheAirlinePilots, "B777 Normal Procedures," last updated Apr. 12, 2013.
Aero Quarterly, "Overweight Landign," 2007.
Goldhammer, "The Next Decade in Commercial Aircraft Aerodynamics," Mar. 31, 2011.
Smart Cockpit, "B737-Emergency_Descent," retrieved Aug. 9. 2013.
Mingione, "Flight in Icing Conditions," Oct. 1997.
Boeiong Aero, "Angle of Attack," Year 4th Qtr. 2000.
Dept. of Transportation, "Aircraft Noise Evaluation," Sep. 1968.
Boeing Aero, "Quiet Climb," 1st Qtr. 2003.
Boeing Aero, "Rejected Takeoff Studies," 3rd Qtr. 2000.

* cited by examiner

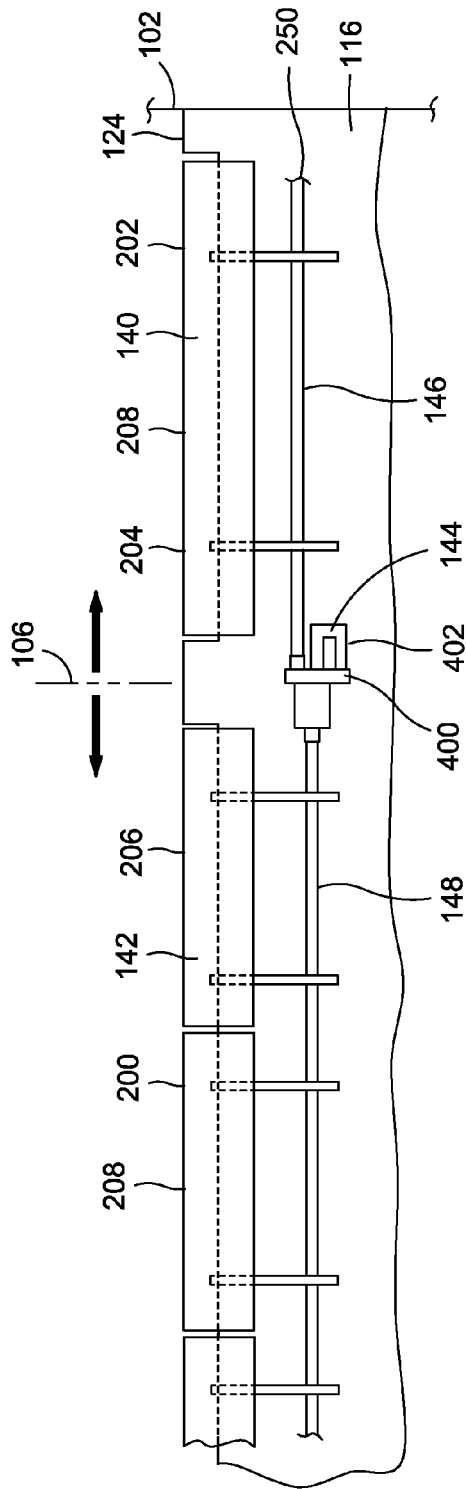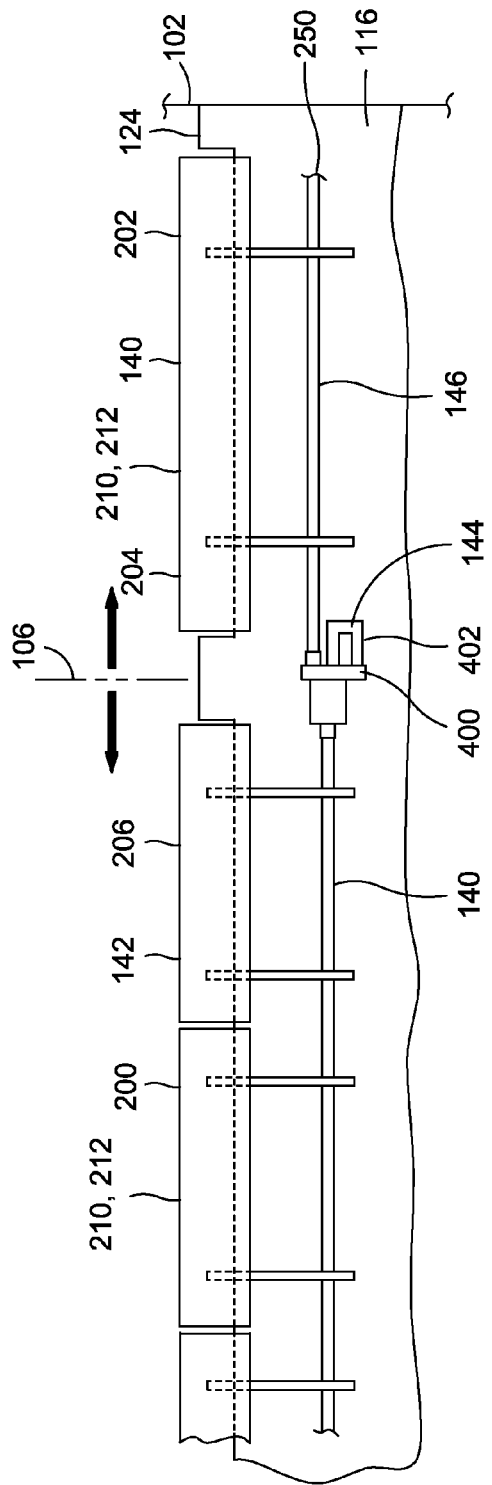

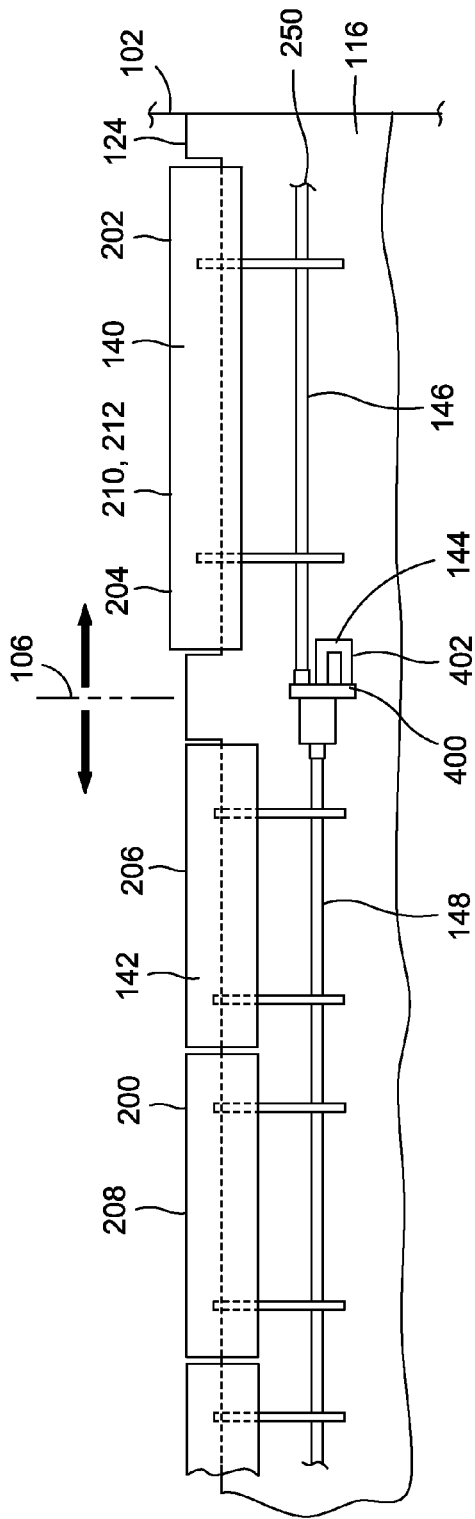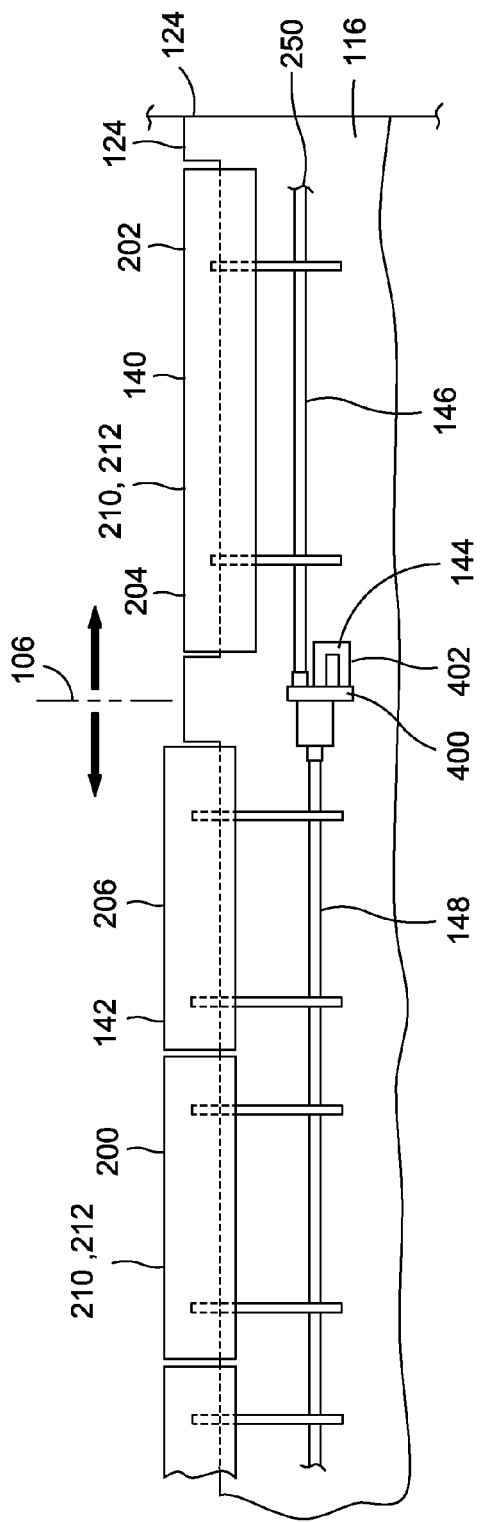

CONTROL INTERFACE FOR LEADING AND TRAILING EDGE DEVICES

FIELD

The present disclosure relates generally to flight controls and, more particularly, to an interface for controlling the leading edge and trailing edge devices of an aircraft wing.

BACKGROUND

Aircraft such as commercial airliners typically include control surfaces or devices mounted on the wings to improve the aerodynamic performance of the aircraft. Such control surfaces include wing leading edge devices and wing trailing edge devices, which may be extended and/or deflected during different phases of flight to alter the lift and/or drag characteristics of the wings. For example, commercial airliners typically include leading edge slats and trailing edge flaps which may be extended and retracted during takeoff, approach, landing, and other flight phases to alter the wing lift characteristics.

During certain flight phases, the flight crew typically performs a large number of tasks during a relatively short period of time. For example, during the approach phase and landing phase of a flight, the flight crew may perform multiple tasks for reconfiguring the aircraft in preparation for landing. Such reconfiguration tasks may include periodically altering the engine thrust setting, arming the spoilers, lowering the landing gear, and other tasks. In addition, the flight crew may need to review instrument landing charts, assess weather conditions at the destination airport, adjust the altimeter, communicate with air traffic control, and continuously monitor the operation of various systems.

Furthermore, during approach and landing, the flight crew may need to make multiple crew-commanded adjustments to the position of the leading and trailing edge devices. The repositioning of the leading and trailing edge devices are typically performed at specific airspeed trigger points. In addition, the positions of the leading and trailing edge devices may be adjusted based on pilot judgment in consideration of maximum operating speeds (e.g., flap placard speeds), instructions from air traffic control, and other considerations.

Conventional aircraft typically allow for extending the leading and trailing edge devices to a limited number of settings for a given flight phase. For example, during takeoff, conventional aircraft may allow for extending the flaps only to a single flap setting, such as a takeoff setting of Flaps 15. Such a takeoff setting may be based on a maximum takeoff weight aircraft with engines operating at maximum takeoff thrust and departing from a standard length runway at sea level. However, the aircraft may have an actual takeoff weight that may be less than the maximum takeoff weight such that the Flaps 15 setting may result in operating the engines at an unnecessarily high thrust setting which may contribute to engine wear and generate excessive engine noise. In addition, positioning the flaps at a flap setting of Flaps 15 may generate a climb rate that is above or below what may be desired and/or required for obstacle or engine-out climb requirements.

As such, there may be a need for improved system and methods for adjusting the position of leading and/or trailing edge devices of aircraft.

SUMMARY

The present disclosure describes examples of systems and methods for controlling high-lift devices (e.g., leading and/ or trailing edge devices) of an aircraft. A system according to the present disclosure may include an interface for placement in a flight deck of an aircraft. The interface may include an edge control device for controlling a position of the high-lift device. The interface may be operable to select any one of a plurality of control device positions. Each one of the plurality of control device positions may correspond to a different flight phase of the aircraft. The edge control device may be operable to engage, in response to a selection of a first control device position, a command mode for actuating the high-lift device in an automated manner based on the flight phase associated with the first control device position.

In a further embodiment, disclosed is an aircraft having a wing including a leading edge device and/or a trailing edge device. The aircraft may include an edge control system including an edge control device positionable in one of a plurality of control device positions. Each one of the control device positions may correspond to a flight phase of the aircraft. The edge control system may be configured to command a device actuation system to actuate the leading edge device and/or the trailing edge device in an automated manner based on the control device position and corresponding flight phase.

Also disclosed is a method of operating a high-lift device of an aircraft wing. The method may include positioning an edge control device of an aircraft in a first control device position from a plurality of control device positions. Each one of the plurality of control device positions may be associated with a flight phase of the aircraft. The method may further include engaging a command mode in response to the positioning of the edge control device in the first control device position. The method may additionally include computing a high-lift device setting, and automatically actuating the high-lift device to the high-lift device setting while the command mode is engaged.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a diagrammatic plan view of a leading edge of a wing and schematically illustrating an inboard slat and an outboard slat in a refracted position;

FIG. 5 is a diagrammatic plan view of the leading edge of the wing of FIG. 4 illustrating the inboard slat and outboard slat actuated in unison;

FIG. 6 is a diagrammatic plan view of the leading edge of the wing of FIG. 4 illustrating the inboard slat actuated independently of the outboard slat;

FIG. 7 is a diagrammatic plan view of the leading edge of the wing of FIG. 4 illustrating the outboard slat actuated independently of the inboard slat;

DETAILED DESCRIPTION

Figure 1:
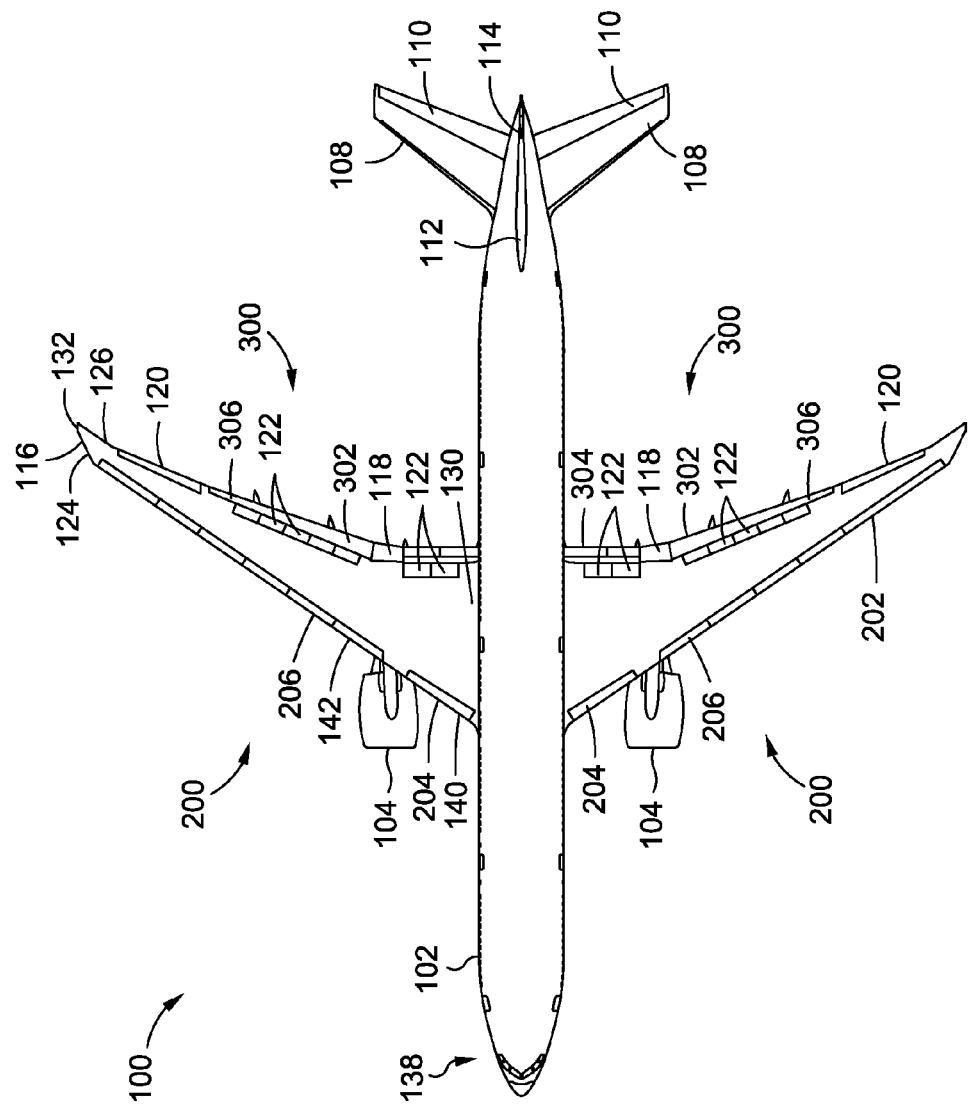
FIG. 1 is a top view of an aircraft.

Referring now to the drawings wherein the showings are for purposes of illustrating preferred and various embodiments of the disclosure, shown in FIG. 1 is a top view of an aircraft 100 having a fuselage 102 and a pair of wings 116. Each wing 116 may be attached to the fuselage 102 and may extend from a wing root 130 to a wing tip 132. The aircraft 100 may include an empennage including a horizontal tail 108 and an elevator 110, and a vertical tail 112 and a rudder 114. The aircraft 100 may further include one or more propulsion units 104 which may be mounted to the wings 116, to the empennage, to the fuselage, or to other structure of the aircraft 100.

As shown in FIG. 1, the aircraft 100 may include one or more leading edge devices 200 and one or more trailing edge devices 300 which may be extended and/or retracted to alter the lift characteristics of the wings 116. For example, the aircraft 100 may include leading edge devices 200 configured as slats 202 mounted to the leading edge 124 of the wings 116. However, the leading edge devices 200 may be provided in alternative configurations such as Krueger flaps or other configurations, and are not limited to slats 202. The leading edge devices 200 may include one or more inboard leading edge devices 200 and one or more outboard leading edge devices 200 such as inboard slats 204 and outboard slats 206, respectively.

The wings 116 may also include trailing edge devices 300 located at the trailing edge 126 of each wing 116. The trailing edge device 300 may be implemented as flaps 302 or other trailing edge device configurations. Similar to the leading edge devices 200, the trailing edge devices 300 may include inboard devices 140 and outboard devices 142. For example, the inboard devices 140 may include one or more inboard flaps 304 and/or an inboard roll-control flap 302 device configured as a flaperon 118 (e.g., a combination flap-aileron). The outboard devices 142 may include one or more outboard flaps 306 and/or an outboard roll-control flap 302 device such as an aileron 120. The trailing edge devices 300 may be provided in other configurations including, but not limited to, elevons and other trailing edge device configurations. The aircraft 100 may also include one or more spoilers 122 on each wing 116, which may be used for generating aerodynamic drag and/or reducing wing lift.

Figure 2:
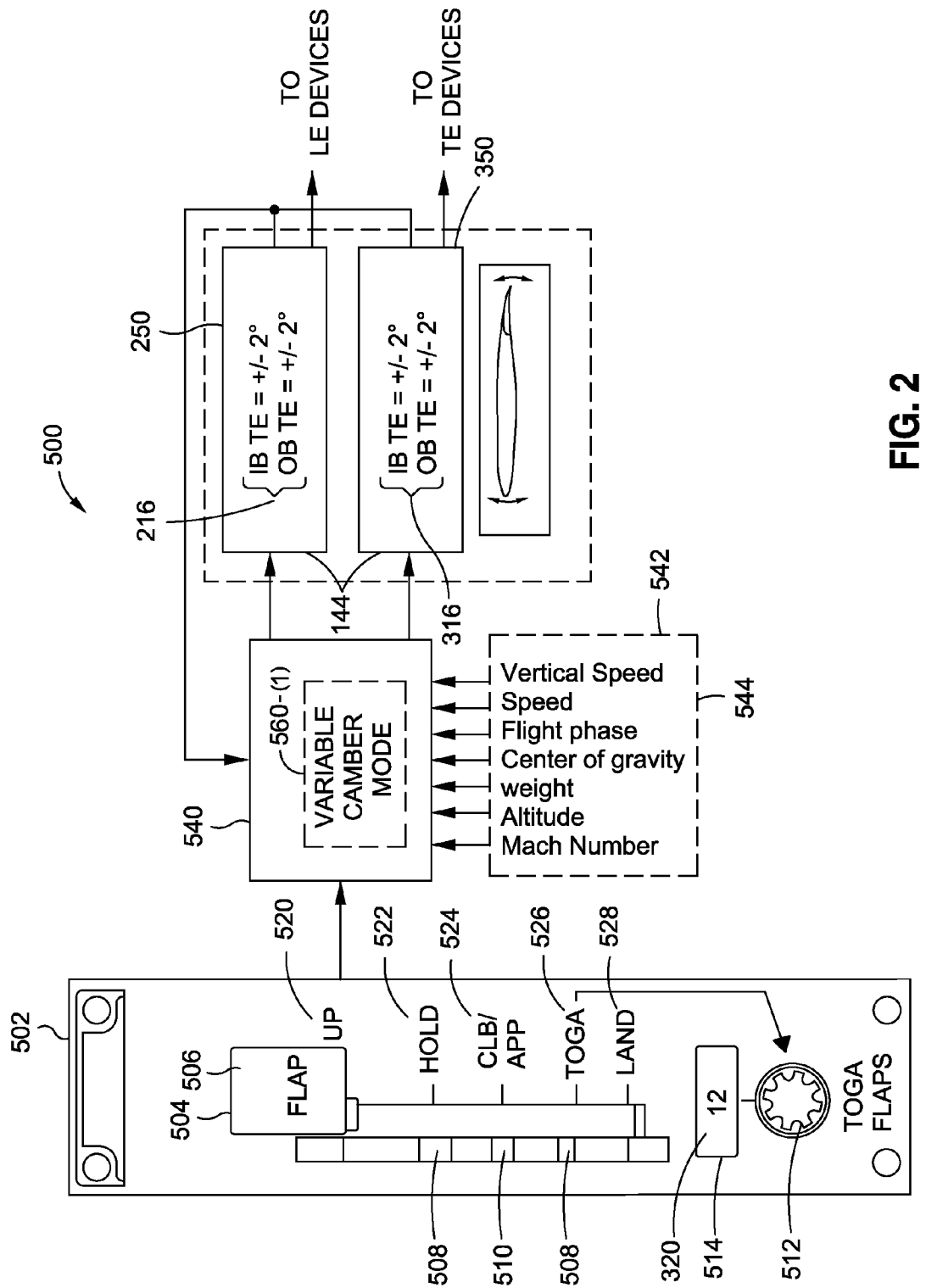
FIG. 2 is a diagrammatic view of an embodiment of an edge control system having an edge control device (e.g., flap control lever) in a cruise position (e.g., UP) for controlling one more leading edge devices and/or trailing edge devices in a variable camber mode.

In FIG. 2, shown is a diagrammatic view of an embodiment of a system 500 for controlling high-lift devices of the aircraft (e.g., leading edge devices 200 and trailing edge devices 300). The system 500 may interchangeably be referred to herein as edge control system 500 and may include an edge control interface 502 for controlling the leading edge devices 200 and/or the trailing edge devices 300 during different phases of flight. The edge control interface 502 may be placed in a flight deck 138 of an aircraft 100 and may include an edge control device 504 such as a flap lever 506. The edge control device 504 may be movable in a forward-and-aft direction. However, the edge control device 504 may be provided in alternative embodiments for controlling the leading edge devices 200 and/or trailing edge devices 300, and is not limited to a flap lever 506. For example, the edge control device 504 may be implemented as a rotary switch, a touchpad, or others. The edge control device 504 may be operable to select any of a plurality of control device positions 510. Each one of the control device positions 510 may correspond to a different flight phase 544 of the aircraft 100. For example, in the case of a flap lever, the flap lever 506 may be movable to a plurality of flap lever positions, as shown in the FIG. 2.

When a control device position 510 is selected, a command mode may be engaged which may cause the edge control system 500 to command a device actuation system 144 (e.g., a slat actuation system 250 and/or a flap actuation system 350) to actuate at least one of the high-lift devices (e.g., leading edge devices 200 and/or trailing edge devices 300) in an automated manner based on the control device position 510 and corresponding flight phase 544 associated with the control device position 510. The edge control device 504 may include one or more mechanical gates 508 to prevent movement of the edge control device 504 unless the edge control device 504 is lifted, depressed, or otherwise manipulated to move the edge control device 504 past the mechanical gate 508 as a means to prevent inadvertent retraction of the leading edge devices 200 and/or trailing edge devices 300.

In FIG. 2, the edge control device 504 may include any one or more of the control device positions 510. For example, the control device positions 510 may include a cruise position 520 (e.g., a first control device position) designated as UP which may correspond to a cruise phase of flight, a hold position 522 (e.g., a second control device position) designated as HOLD which may correspond to a hold phase when the aircraft 100 is in a holding pattern, and a climb/approach position 524 (e.g., a third control device position) designated as CLB/APP which may correspond to a climb phase when the aircraft 100 is climbing after takeoff, or which may correspond to an approach phase such as when the aircraft 100 is descending from a cruising altitude in preparation for landing. The control device positions 510 may further include a takeoff/go-around position 526 (e.g., a fourth control device position) designated as TOGA which may correspond to a takeoff phase or a go-around operation initiated during an aborted landing. The control device positions 510 may also include a landing position 528 (e.g., a fifth control device position) designated as LAND which may correspond to a landing phase of the aircraft 100. However, the edge control device 504 may include control device positions 510 in addition to or other than the control device positions 510 shown in FIG. 2. Furthermore, the control device positions 510 may be designated by different nomenclature, and are not limited to the illustrated designations. In this regard, the control device positions 510 may be identified by any one of a variety of different labeling systems, and are not limited to the designations UP, HOLD, CLB/APP, TOGA, and LAND.

In FIG. 2, when the edge control device 504 is in the cruise position 520 (e.g., a first control device position), the edge control system 500 may automatically command the device actuation system 144 to actuate one or more high-lift devices (e.g., one or more leading edge devices 200 and/or one or more trailing edge devices 300) in a variable camber mode. For example, the edge control system 500 may command the device actuation system 144 to actuate one or more leading edge devices 200 and/or one or more trailing edge devices 300 in an upward direction 210, 310 and a downward direction 212, 312 relative to a refracted position 208, 308 when the aircraft 100 is in a cruise phase of flight. The edge control device 504 may be communicatively coupled to a flight control computer 540 which may be configured to compute a setting for a high-lift device based upon aircraft state data 542. The edge control system 500 may include one or more actuation systems 144 configured to automatically actuate one more high-lift device(s) to the high-lift device setting if a command mode is engaged. In some examples, the high-lift device setting may be an optimum device setting. For example, the flight control computer 540 may determine an optimum slat setting 220 for the leading edge slats 202, and/or an optimum flap setting 320 for the trailing edge flaps 302 based on aircraft state data 542. The aircraft state data 542 may include, without limitation, aircraft gross weight, aircraft center of gravity, Mach number, airspeed, altitude, and other data.

When the edge control device 504 is in the cruise position 520, the edge control system 500 may automatically command the slat actuation system 250 and/or the flap actuation system 350 to position the slats 202 and/or flaps 302 at the respective optimum slat setting 220 and optimum flap setting 320 as determined by the flight control computer 540 based upon the aircraft state data 542. As described below, when the edge control device 504 is in the cruise position 520, the leading edge devices 200 and/or trailing edge devices 300 may be actuated along an upward direction 210, 310 and/or a downward direction 212, 312 within relatively small deflection angles 216, 316 relative to a retracted position 208, 308. Furthermore, the edge control system 500 may command the device actuation systems 144 to periodically reposition the leading edge devices 200 (e.g., the slats 202) and/or trailing edge devices 300 (e.g., the flaps 302) according to a slat positioning schedule and a flap positioning schedule when the edge control device 504 is in the cruise position 520 and the aircraft 100 is flying above a predetermined altitude and operating within a predetermined airspeed range or Mach number range.

Figure 3:
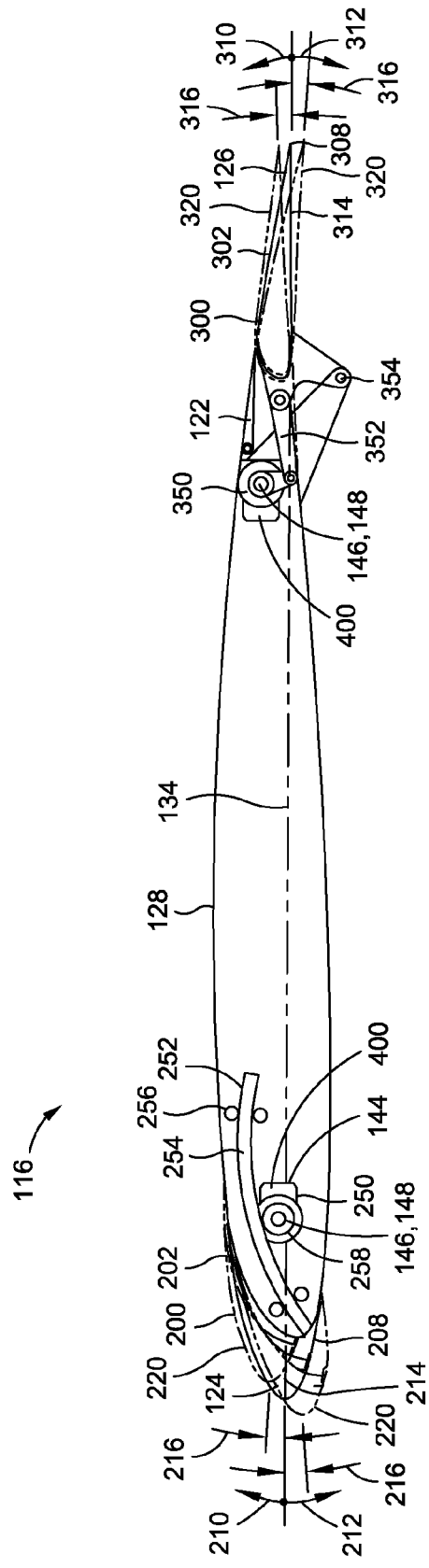
FIG. 3 is a sectional view of a wing illustrating upward and downward deflection of a leading edge slat and a trailing edge flap in the variable camber mode when the edge control device is in the cruise position.

Referring to FIG. 3, shown is a cross section of an aircraft wing 116 having a slat 202 mounted on the leading edge 124 of the wing 116, and a flap 302 mounted on the trailing edge 126 of the wing 116. The slat 202 and flap 302 are shown in solid lines in a retracted position 208, 308. Spoilers 122 may be mounted on a wing upper surface 128 and may partially overlap the forward edge of the flaps 302. The spoilers 122 may be deployed to generate aerodynamic drag and/or reduce aerodynamic lift of the wings 116. When the edge control device 504 is in the cruise position 520, the slat 202 and flap 302 may be actuated in a variable camber mode in an upward direction 210, 310 and downward direction 212, 312 as shown in phantom lines in FIG. 3.

In FIG. 3, the leading edge devices 200 such as the slats 202 may be actuated by a slat actuation system 250. The slats 202 may be coupled to an inboard torque tube 146 and an outboard torque tube 148 or other mechanical linkage. The inboard torque tube 146 on the leading edge 124 may be coupled to a centrally-located leading edge, power drive unit (PDU) (not shown). Each slat 202 may be supported by one or more carrier track assemblies 252 which may each include a guide track 254 supported by one or more guide rollers 256 mounted to the wing 116. Each one of the torque tubes 146, 148 may include a pinion gear 258 for engaging the guide track 254. Extension and retraction of the slats 202 may be effectuated by rotating the torque tubes 146, 148 using the PDU. Each PDU may operate in conjunction with a variable camber trim unit (VCTU). As described below, a VCTU 400 may be positioned between an inboard leading edge device 200 and an outboard leading edge device 200 on each wing 116 to allow for independent actuation of the inboard and outboard slats 204, 206.

In FIG. 3, the trailing edge device 300 is shown as a simple flap 302 supported on a drop hinge 354. However, the flap 302 may be provided in any one of a variety of different configurations and is not limited to a simple flap. For example, the flap 302 may be configured as a plain flap, a single-slotted flap, a multi-slotted Fowler flap, or any one of a variety of other trailing edge device 300 configurations that may be actuated by the device actuation system 144. The flap 302 may be actuated by a flap actuation system 350 using a trailing edge linkage assembly 352 that may be coupled to a torque tube 146, 148. The flap actuation system 350 may also include a centrally-located, trailing edge PDU (not shown), which may operate in conjunction with a VCTU 400 positioned between an inboard flap 304 and an outboard flap 306 on each wing 116 to allow for independent actuation of the inboard and outboard flaps 304, 306.

In FIG. 3, when the edge control device 504 is in the cruise position 520, the edge control system 500 may automatically command the device actuation system 144 to adjust the position of the slats 202 and flaps 302 in relatively small deflection increments in an upward direction 210, 310 relative to the retracted position 208, 308, and/or in relatively small deflection increments in a downward direction 212, 312 relative to the retracted position 208, 308. The deflection increments may be no greater than approximately one (1) degree of actual slat angle or actual flap angle. However, the slats 202 and flaps 302 may be adjusted in increments of greater than one (1) degree of flap angle or slat angle. The slat actuation system 250 may be configured such that slat 202 movement is limited to within a slat deflection angle 216 of less than approximately three (3) degrees in each of the upward direction 210 and the downward direction 212 relative to the retracted position 208 of the slat 202. Likewise, the flap actuation system 350 may be configured such that flap 302 movement is limited to within a flap deflection angle 316 of less than approximately three (3) degrees in each of the upward direction 310 and the downward direction 312 relative to the refracted position 308 of the flap 302. The slat deflection angle 216 may be defined as the angle between a local wing chord line 134 and a local slat chord line 214. The slat chord line 214 may extend through a forward-most point on the slat 202 when the slat 202 is in the refracted position 208. Likewise, for the simple flap 302 illustrated in FIG. 3, the flap deflection angle 316 may be defined as the angle between the local wing chord line 134 and a local flap chord line 314. The local flap chord line 314 may be aligned with the local wing chord line 134 when the flap 302 is in the retracted position 308.

Referring to FIG. 4, shown is diagrammatic plan view of a leading edge 124 of the wing 116 illustrating differential deployment of the inboard and outboard leading edge devices 200. In an embodiment, the propulsion unit centerline 106 may divide the inboard devices from the outboard devices. Although not shown, the inboard and outboard trailing edge devices 300 (e.g., inboard and outboard flaps 304, 306—FIG. 1) may be differentially deployed in a manner similar to the below-described differential deployment of the inboard and outboard leading edge devices 200. Advantageously, when the edge control device 504 is in the cruise position 520, the edge control system 500 may automatically command the device actuation system 144 to differentially actuate the inboard devices 140 and outboard devices 142 in an upward direction 210, 310 and downward direction 212, 312 to alter the wing camber as a means to reduce aerodynamic drag and/or to optimize the distribution of aerodynamic lift along a spanwise direction of the wings 116. Differential deployment may be effectuated by operating a PDU in conjunction with a VCTU 400 positioned between an inboard device 140 and outboard device 142. The VCTU 400 may include a dedicated VCTU electric motor 402 that may include a speed sum gearbox (not shown) having a planetary gear arrangement allowing for differential rotation of the inboard torque tube 146 relative to the outboard torque tube 148.

FIG. 5 illustrates actuation of the inboard slat 204 and outboard slats 206 in unison with one another. Although not shown, the centrally-located PDU may be activated for rotating the inboard torque tube 146. The VCTU 400 may transfer the rotation of the inboard torque tube 146 to the outboard torque tube 148 are actuated in unison. FIG. 6 illustrates actuation of the inboard slat 204 independent of the outboard slats 206. In such an arrangement, the VCTU 400 may be configured to prevent rotation of the outboard torque tube 148 while allowing the PDU to rotate the inboard torque tube 146. FIG. 7 illustrates actuation of the outboard slat 206 independent of the inboard slats 204. In such an arrangement, the centrally-located PDU may be locked to prevent rotation of the inboard torque tube 146 while the VCTU electric motor 402 is activated to cause rotation of the outboard torque tube 148.

Figure 8:
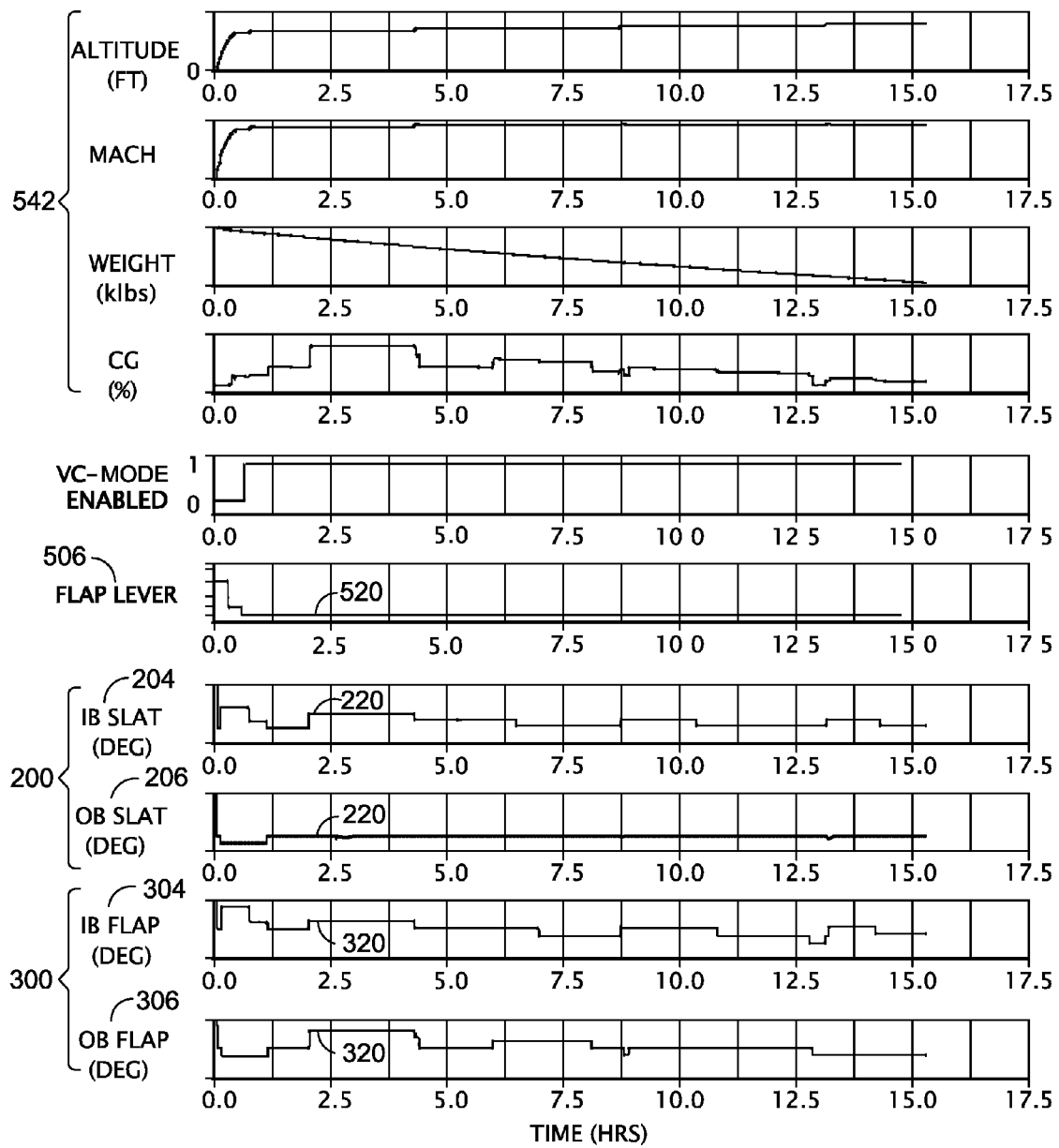
FIG. 8 shows several graphs illustrating the actuation of the leading edge devices and trailing edge devices in a variable camber mode when the edge control device is in the cruise position.

Referring to FIG. 8, shown are several graphs illustrating a non-limiting example of automatic actuation of the leading edge slats 202 and trailing edge flaps 302 in the variable camber mode when the edge control device 504 (e.g., flap lever 506) is in the cruise position 520 and the aircraft 100 is in cruise flight. With the variable camber mode enabled and the flap lever maintained in the same position (e.g., the cruise position 520), the slats 202 and the flaps 302 may be periodically repositioned at their respective optimum device settings 220, 320 as a function of aircraft state data 542. The slats 202 and the flaps 302 may be positioned within the above-mentioned relatively small deflection angles 216, 316 to optimize the wing camber according to a predetermined deflection schedule. The aircraft state data 542 may include altitude, Mach number, aircraft gross weight, and aircraft center of gravity which are shown plotted over time (e.g., in hours) in FIG. 8. The graphs illustrate the slat deflection angles 216 of the inboard and outboard slats 204, 206 and flaps 304, 306 and the differential deployment thereof. When the edge control device 504 is in the cruise position 520, the edge control system 500 may advantageously periodically (e.g., every 5 minutes, 10 minutes, etc.) reposition the slats 202 and flaps 302 according to weight-CG-altitude-airspeed scheduled surface deflection angles within the limits of the above described slat deflection angle 216 and flap deflection angle 316 for drag reduction and/or wing load alleviation.

Figure 9:
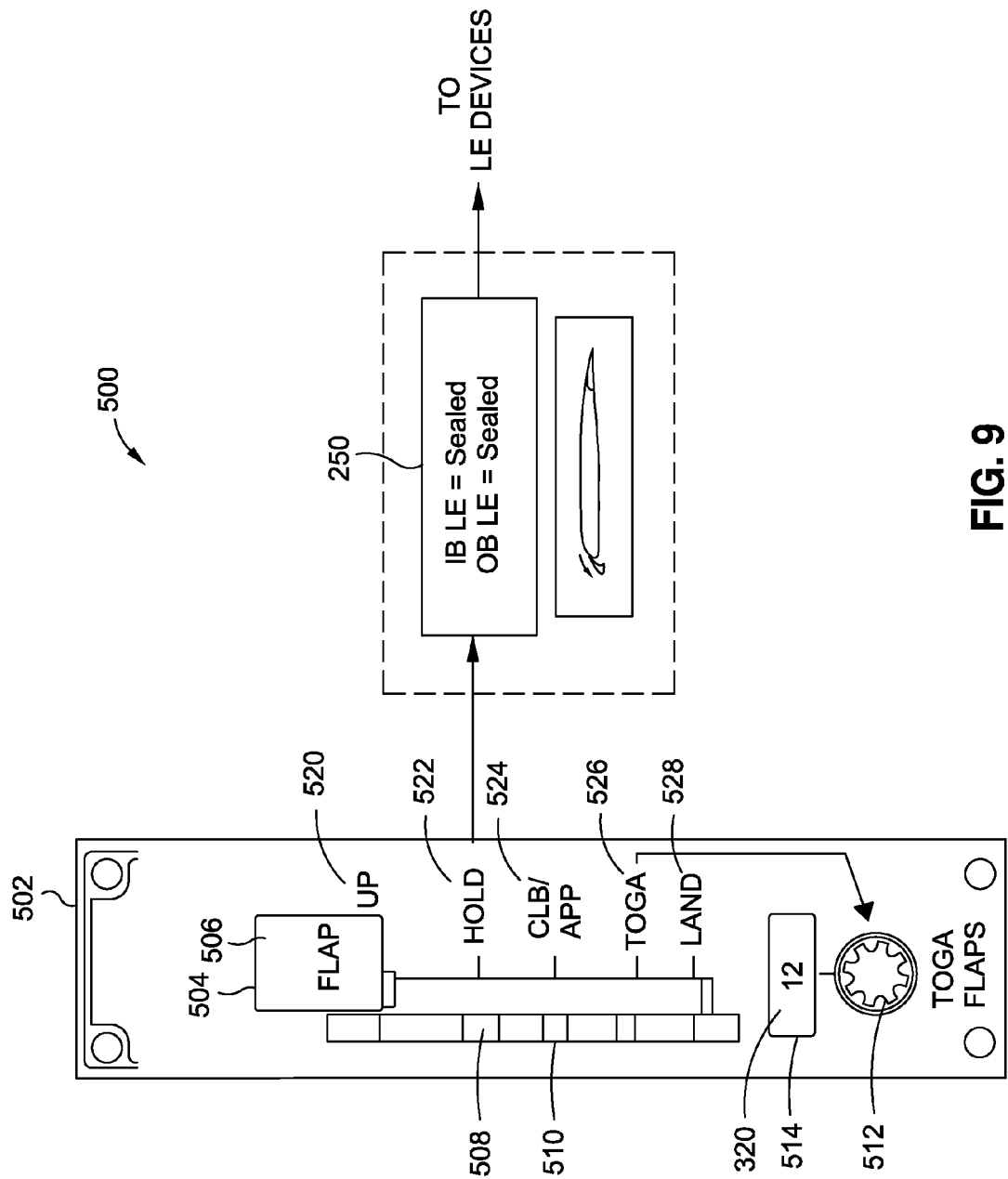
FIG. 9 is a diagrammatic view of an embodiment of the edge control system with the edge control device in a hold position for actuating a leading edge device to a sealed position.

Referring to FIG. 9, shown is an embodiment of the edge control system 500 with the edge control device 504 in a hold position 522 (e.g., a second control device position). The edge control system 500 may be operable to engage, in response to the selection of a second control device position, a command mode for automatically commanding one or more leading edge devices to a sealed position 222. In this regard, the device actuation system 144 may automatically position one or more leading edge devices 200 in the sealed position 222 when the edge control device 504 is moved to the hold position 522 and the aircraft 100 is in a holding phase. For example, when the aircraft 100 is descending for landing, instructions may be received from air traffic control to place the aircraft 100 in a holding pattern. The pilot or flight crew may move the edge control system 500 from the cruise position 520 to the hold position 522.

Figure 10:
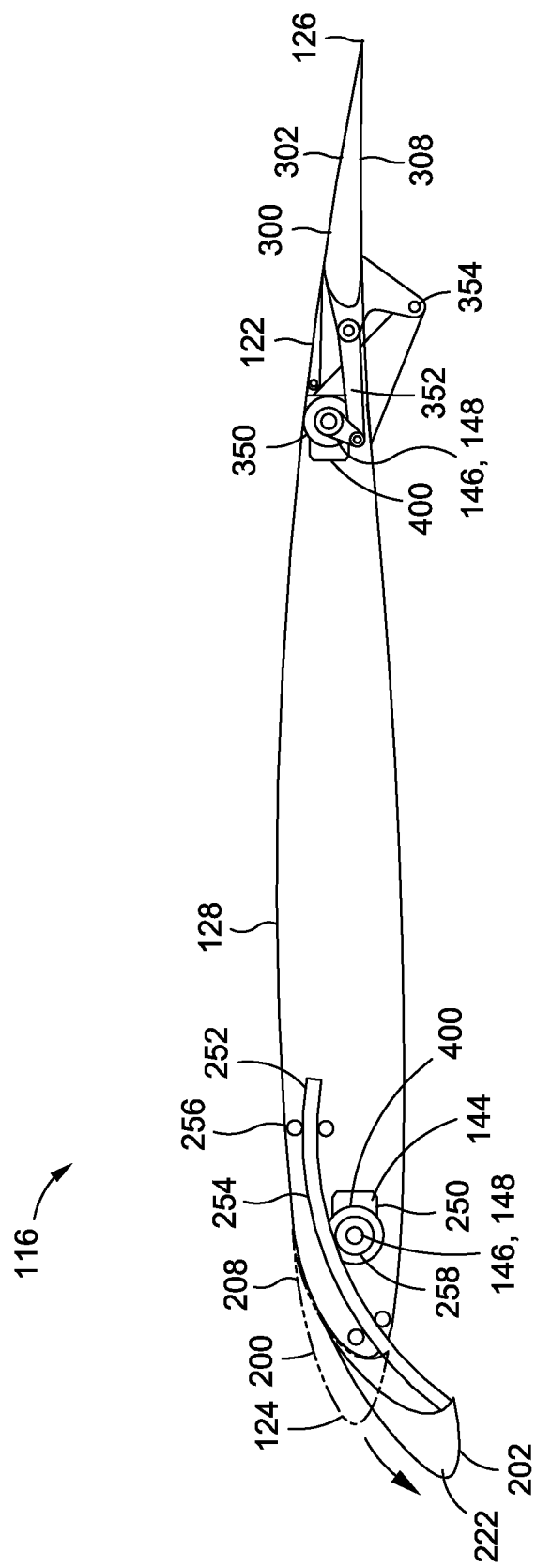
FIG. 10 is a sectional view of a wing illustrating positioning of a leading edge slat in the sealed position when the edge control device is in the hold position.

Referring to FIG. 10, shown is a sectional view of a wing 116 illustrating movement of a leading edge slat 202 to the sealed position 222. The inboard slats 204 and the outboard slats 206 may be moved from an optimum slat setting 220 (i.e., in the variable camber mode) to the sealed position 222 in response to movement of the edge control device 504 from the cruise position 520 to the hold position 522. The extension of the slats 202 from the retracted position 208 to the sealed position 222 may allow for a reduction in the airspeed of the aircraft 100 to reduce fuel consumption and allow the aircraft 100 to remain within a designated airspace until further instructions are received from air traffic control to initiate an approach to an airport runway.

Figure 11:
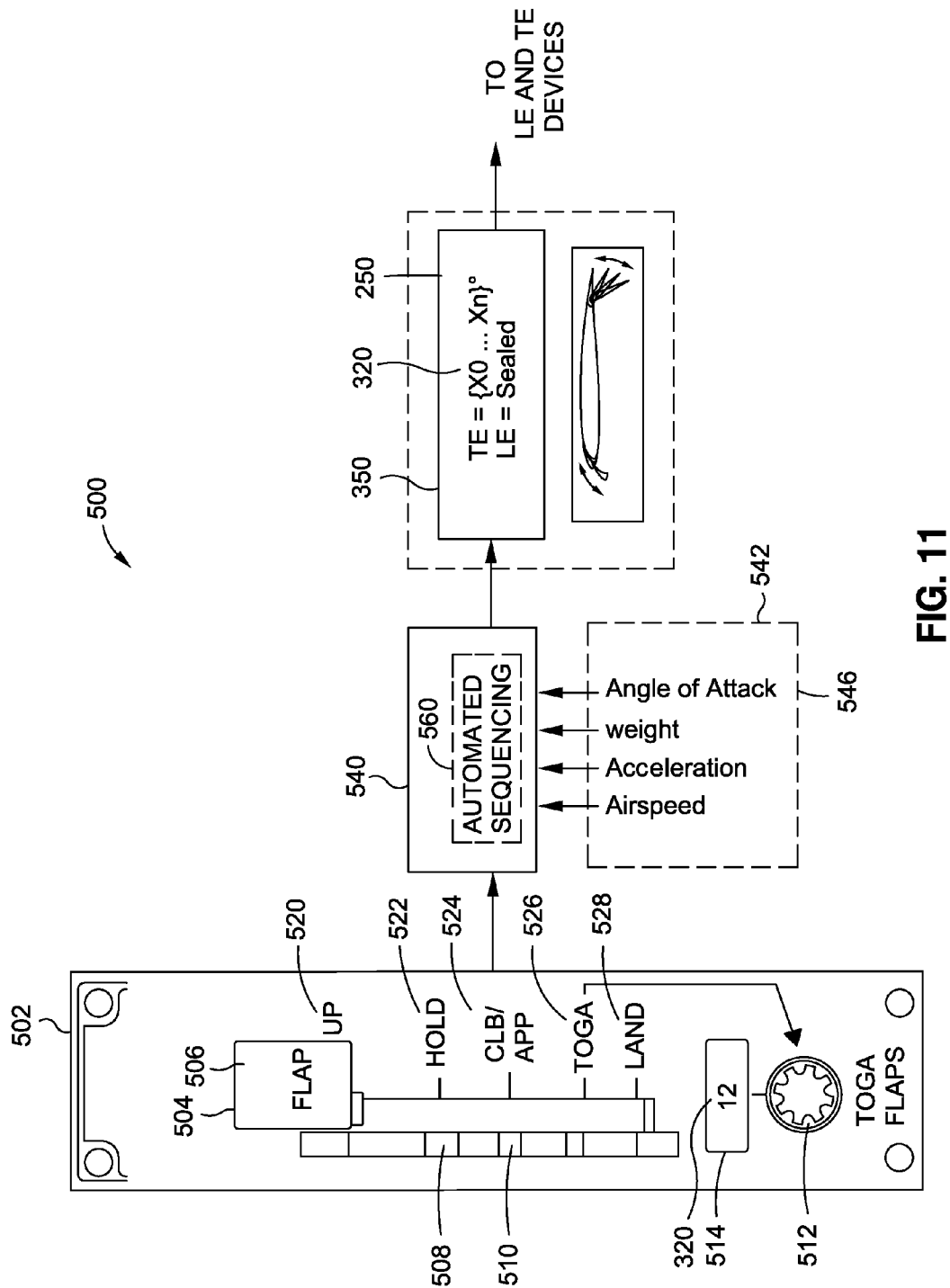
FIG. 11 is a diagrammatic view of an embodiment of the edge control system with the edge control device in a climb/approach position for automatically extending and retracting one or more trailing edge devices according to a respective extension sequence and retraction sequence.

Referring to FIG. 11, shown is an embodiment of the edge control system 500 with the edge control device 504 moved to a climb/approach position 524. The edge control system 500 may be configured to command the device actuation system 144 to automatically extend one or more of the trailing edge devices 300 according to an extension sequence when the edge control device 504 is moved to the climb/approach position 524 (e.g., from the cruise position 520 or from the hold position 522) and the aircraft 100 is in an approach phase such as when the aircraft 100 is descending for a landing. The edge control system 500 may also be configured to command the device actuation system 144 to automatically retract one or more of the trailing edge devices 300 according to a retraction sequence when the edge control device 504 is moved to the climb/approach position 524 and the aircraft 100 is in a climbing phase such as after takeoff from a runway or during a go-around operation following an aborted landing.

Figure 12:
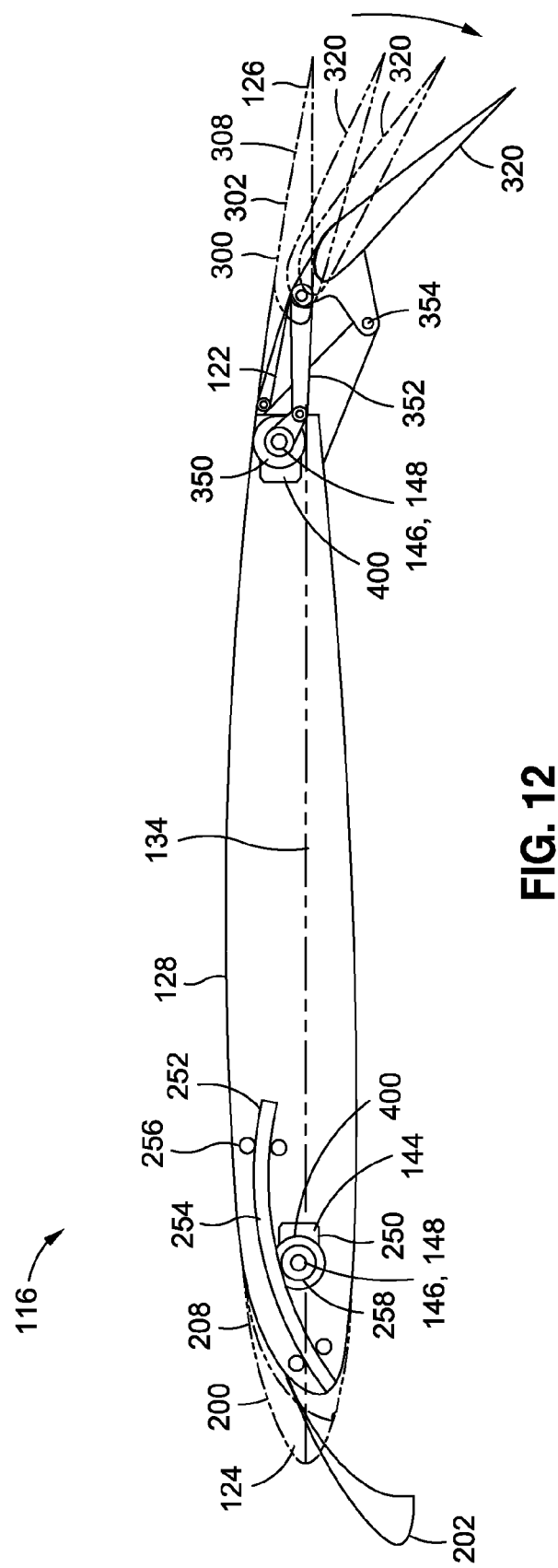
FIG. 12 is a sectional view of a wing illustrating the positioning of a leading edge slat in the sealed position and the automated extension of the trailing edge flap according to an extension sequence when the edge control device is the climb/approach position.

Referring to FIG. 12, shown is sectional view of a wing 116 with the leading edge slat 202 moved from the retracted position 208 to the sealed position 222 when the edge control device 504 is moved from the cruise position 520 to the climb/approach position 524. If the leading edge slat 202 is already in the retracted position 208 as a result of the edge control device 504 being in the hold position 522, then the slat 202 may be maintained in the refracted position 208 when the edge control device 504 is moved from the hold position 522 to the climb/approach position 524. In addition, shown in FIG. 12 is the automated extension of the trailing edge flaps 302 from the retracted position to progressively deeper flap 302 settings according to a flap extension sequence.

The automated extension of the flaps 302 may advantageously reduce the number of tasks required by the flight crew. In addition, the flight control computer 540 (FIG. 11) may position the flaps 302 at optimum flap settings 320 based on continuously monitored aircraft state data 542 such as aircraft angle of attack, aircraft gross weight, acceleration, airspeed, altitude, and other aircraft parameters. The flight control computer 540 may be preprogrammed with data such as flap placard speeds to avoid exceeding the airspeed limitations of the flaps. When the aircraft 100 is climbing such as after departure from an airport runway, the edge control system 500 may command the flap actuation system 350 to periodically retract the flaps 302 according to a sequence of optimum flap settings 320 computed by the flight control computer 540 based on the aircraft state data 542. When the aircraft 100 is descending, the edge control system 500 may command the flap actuation system 350 to periodically extend the flaps 302 according to a sequence of optimum flap settings 320 computed by the flight control computer 540 based on the aircraft state data 542.

Figure 13:
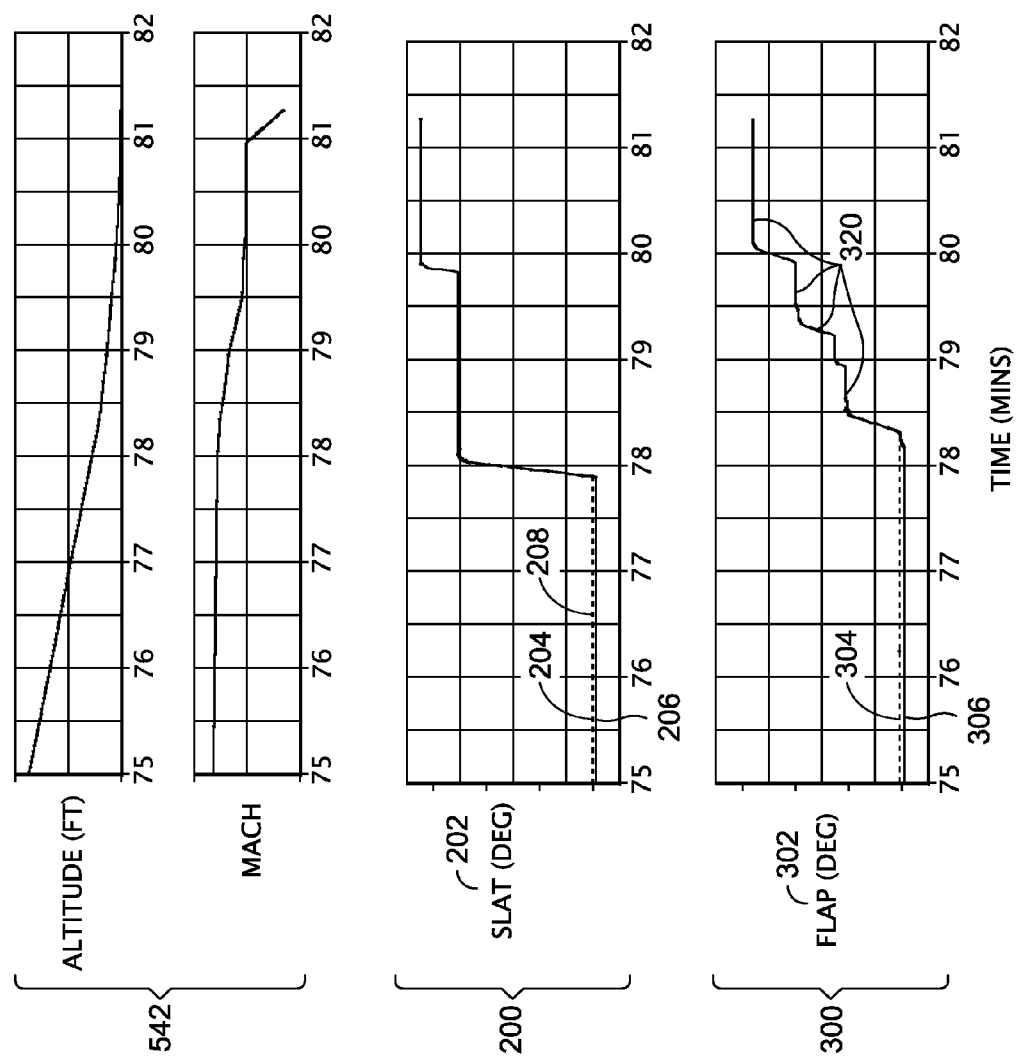
FIG. 13 shows several graphs illustrating the automated extension of the slats and flaps as a function of Mach number and altitude when the edge control device is the climb/approach position.

Referring to FIG. 13, shown are several graphs illustrating the automated extension of the slats 202 and flaps 302 as a function of aircraft state data 542 when the edge control device 504 is moved to the climb/approach position 524 and the aircraft 100 is descending during an approach phase. The aircraft state data 542 may include altitude and Mach number which is shown plotted over time in FIG. 13. Also shown is the automated extension of the slats 202 from a refracted position 208 to a sealed position 222 at approximately the 78-minute mark on the graphs, and the sequence of extension of the flaps 302 shortly after the 78-minute mark. From the 75-minute mark to the 78-minute mark, the graphs show the inboard slats 204 and flaps 302 in dashed lines and the outboard slats 206 and flaps 302 in solid lines to illustrate the differential deployment of the slats 202 and flaps 302 according to the automated extension sequence during descent of the aircraft 100.

Figure 14:
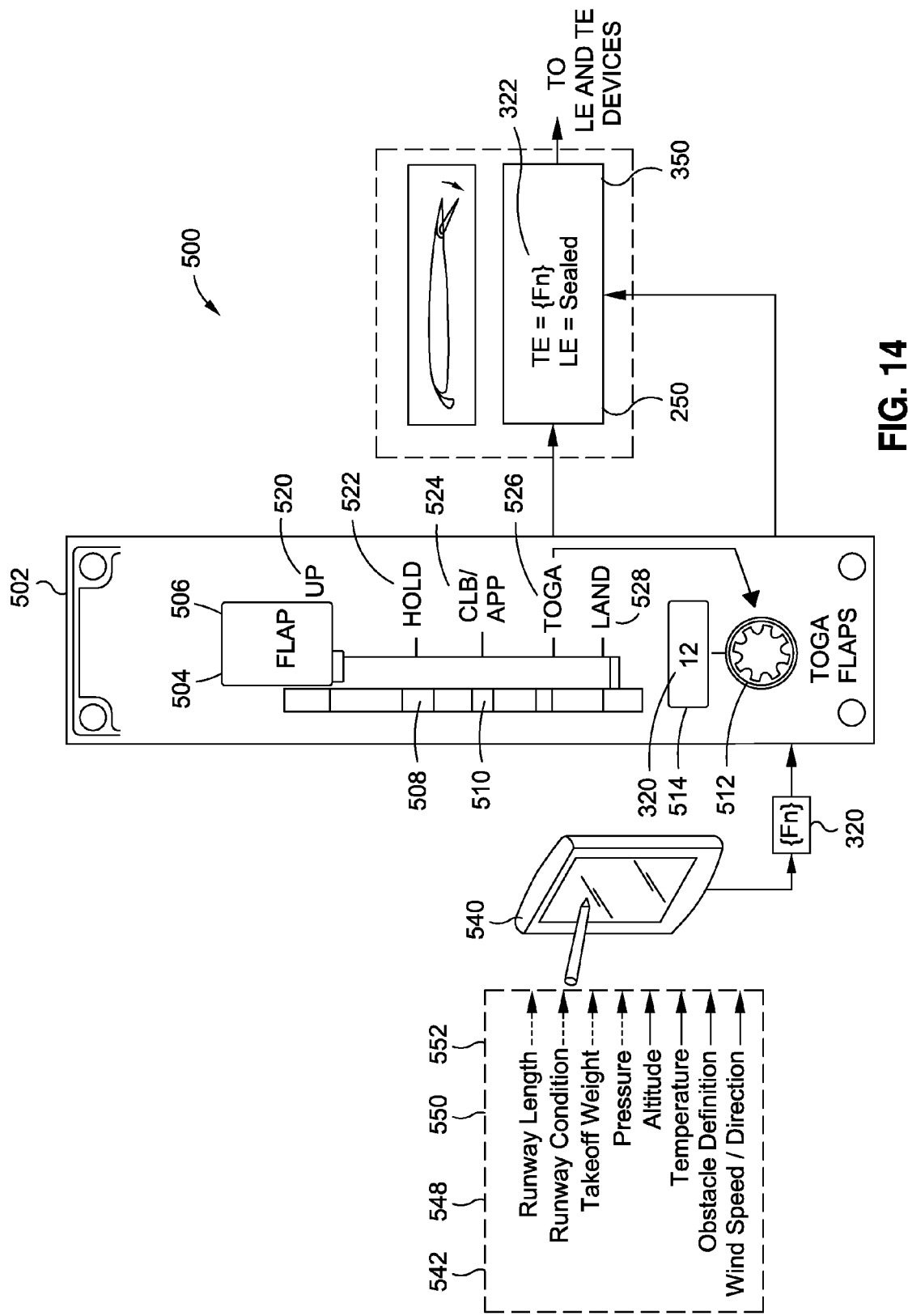
FIG. 14 is a diagrammatic view of an embodiment of the edge control system with the edge control device in a takeoff/go-around position for positioning one or more trailing edge devices at an optimized flap setting for an aircraft on takeoff.

Referring to FIG. 14, shown is an embodiment of the edge control system 500 with the edge control device 504 moved to a takeoff/go-around position 526. The edge control system 500 may be configured to command the device actuation system 144 to position one or more of the trailing edge devices 300 at an optimum flap setting 320 when the edge control device 504 is moved to the takeoff/go-around position 526 and the aircraft 100 is in a takeoff phase. The edge control system 500 may include a flight control computer 540 for computing the optimum flap setting 320 based on aircraft state data 542 and/or airport information 548. The aircraft state data 542 and/or airport information 548 may be preloaded into the flight control computer 540 and/or entered into the flight control computer 540 by the flight crew or by an airline dispatcher or other personnel. The flight control computer 540 may compute the optimum flap setting 320 prior to takeoff and/or at any time during a flight.

In FIG. 14, the aircraft state data 542 may include aircraft gross weight, aircraft center of gravity, takeoff thrust of the propulsion units, and other aircraft state data 542 representing the state of the aircraft 100. Airport information 548 may include airport parameters 550 and/or airport atmospheric data 552. Airport parameters 550 may include generally static or non-changing data regarding an airport. For example, airport parameters 550 may include runway length, local terrain information, obstacle definition such as obstacle height and location relative to the runway, airport elevation, and other parameters. Airport atmospheric data 552 may include data representative of the meteorological conditions at the airport and may include barometric pressure, outside air temperature, wind speed, wind direction, wind gust information, and other atmospheric data 552.

In FIG. 14, the edge control system 500 may include a display window 514 for displaying the value (e.g., a numerical value) of the optimum flap setting 320 as a visual indication to the flight crew. The display window 514 may be located below the flap 302 control lever or in any other location that is visible by the flight crew such as on a main display (not shown) of the flight control instrumentation (not shown). The optimum flap setting 320 displayed in the display window 514 may change with real-time changes in the aircraft state data 542 and/or real-time changes in airport information 548. The display window 514 may also display a desired flap setting 322 that may be selected by the flight crew as described below.

In FIG. 14, the edge control system 500 may include a variable-trailing-edge-position switch 512 which may function as a second edge control device or supplemental input device for the high-lift devices. In this regard, the second edge control device (e.g., the variable-trailing-edge-position switch 512) may enable selection by the flight crew of a desired setting for the high-lift devices different from the computed high-lift device setting without requiring movement of the first edge control device (e.g., a flap lever 506) from the first control device position (e.g., from a cruise position 520). In some examples, the desired setting may be a desired flap setting 322 based on the optimum flap setting 320 computed by the flight control computer 540. The variable-trailing-edge-position switch 512 may be operative when the edge control device 504 is in the takeoff/go-around position 526. However, the variable-trailing-edge-position switch 512 may be operative when the edge control device 504 is in control device positions 510 other than the takeoff/go-around position 526. Advantageously, the variable-trailing-edge-position switch 512 may provide the flight crew with the means to adjust or fine tune the optimum flap setting 320 to a desired flap setting 322 that may be different than the optimum flap setting 320. For example, moving the edge control device 504 into the takeoff/go-around position 526 may cause the flaps 302 to be automatically commanded to an optimum flap deflection angle 316 of twenty (20) degrees as computed by the flight control computer 540. The flight crew may manually rotate the variable-trailing-edge-position switch 512 to change the flap setting from an optimum flap deflection angle 316 of twenty (20) degrees to a desired flap deflection angle 316 of eighteen (18) degrees.

Although shown as a rotary dial having a digital display window 514, the variable-trailing-edge-position switch 512 may be configured as an analog dial having flap setting values arranged in a circular pattern around the variable-trailing-edge-position switch 512. Alternately, the variable-trailing-edge-position switch 512 may be configured as a push-button device, as a mechanical slider, or in other configurations. The variable-trailing-edge-position switch 512 may be configured to position the flaps 302 or other trailing edge devices 300 within a predetermined flap setting range. For example, when the edge control device 504 is in the takeoff/go-around position 526, the variable-trailing-edge-position switch 512 may be limited to selecting a flap deflection angle 316 of between approximately 5-20 degrees, or some other flap 302 setting range.

In FIG. 14, the variable-trailing-edge-position switch 512 may include a plurality of switch positions. The difference between two adjacent switch positions may correspond to a flap deflection increment for adjusting the position of the flaps 302 as indicated above. For example, moving the variable-trailing-edge-position switch 512 from 17 (not show) to 18 (FIG. 14) may move the flaps 302 by a flap deflection increment of approximately one (1) degree of actual flap angle. However, moving the variable-trailing-edge-position switch 512 between two adjacent switch positions may move the flaps 302 in flap deflection increments of less than or greater than approximately one (1) degree of actual flap angle.

In an embodiment, the variable-trailing-edge-position switch 512 may be configured to be non-movable unless commanded by positive action from the flight crew. For example, the variable-trailing-edge-position switch 512 may require depressing the variable-trailing-edge-position switch 512, or pulling up on the variable-trailing-edge-position switch 512 before the switch can be moved or rotated. The variable-trailing-edge-position switch 512 may also be configured as a detented switch having discrete contacts and/or mechanical stops to prevent inadvertent actuation of the variable-trailing-edge-position switch 512. In addition, the variable-trailing-edge-position switch 512 may be configured such that flap extension and flap retraction are commanded by moving the variable-trailing-edge-position switch 512 in mutually exclusive directions. In a further embodiment, instead of mechanically selecting a desired flap setting 322 using the variable-trailing-edge-position switch 512, a desired flap setting 322 may be digitally selected in a software program (not shown) that may optionally be implemented in the flight control computer 540. Such an arrangement may also include a means for allowing the flight crew to override the optimum flap setting 320 or adjust the optimum flap setting 320 to a desired flap setting 322 which may be different than the optimum flap setting 320

Figure 15:
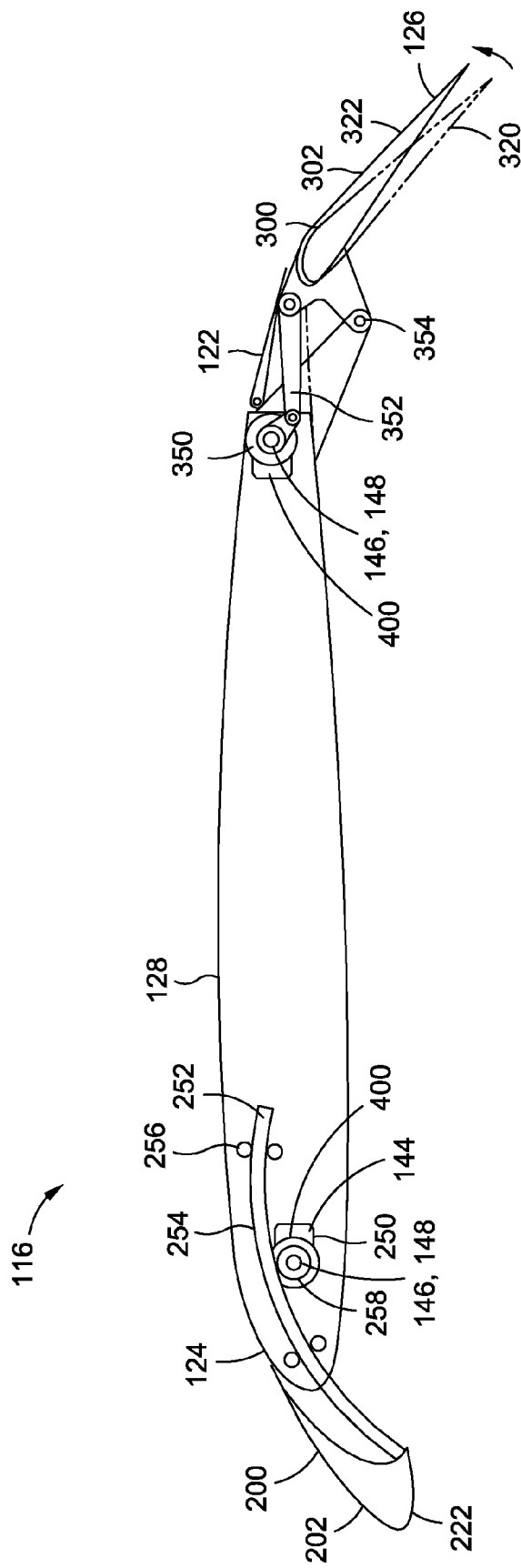
FIG. 15 is a sectional view of a wing illustrating the positioning of a trailing edge flap at the optimized flap setting when the edge control device is the takeoff/go-around position and the aircraft in on takeoff.

Referring to FIG. 15, shown is a sectional view of a wing 116 illustrating the positioning of the leading edge device 200 in the sealed position 222 on the wing leading edge 124 when the edge control device 504 is in the takeoff/go-around position 526. The trailing edge flap 302 may be automatically commanded to an optimum flap setting 320 (shown in solid lines) when the edge control device 504 is in the takeoff/go-around position 526. Shown in phantom lines is the flap 302 moved to a desired flap setting 322 which may be different than the optimum flap setting 320 computed by the flight control computer 540. The variable-trailing-edge-position switch 512 may allow the flight crew to fine-tune the flap setting in relatively small flap deflection increments 318.

Figure 16:
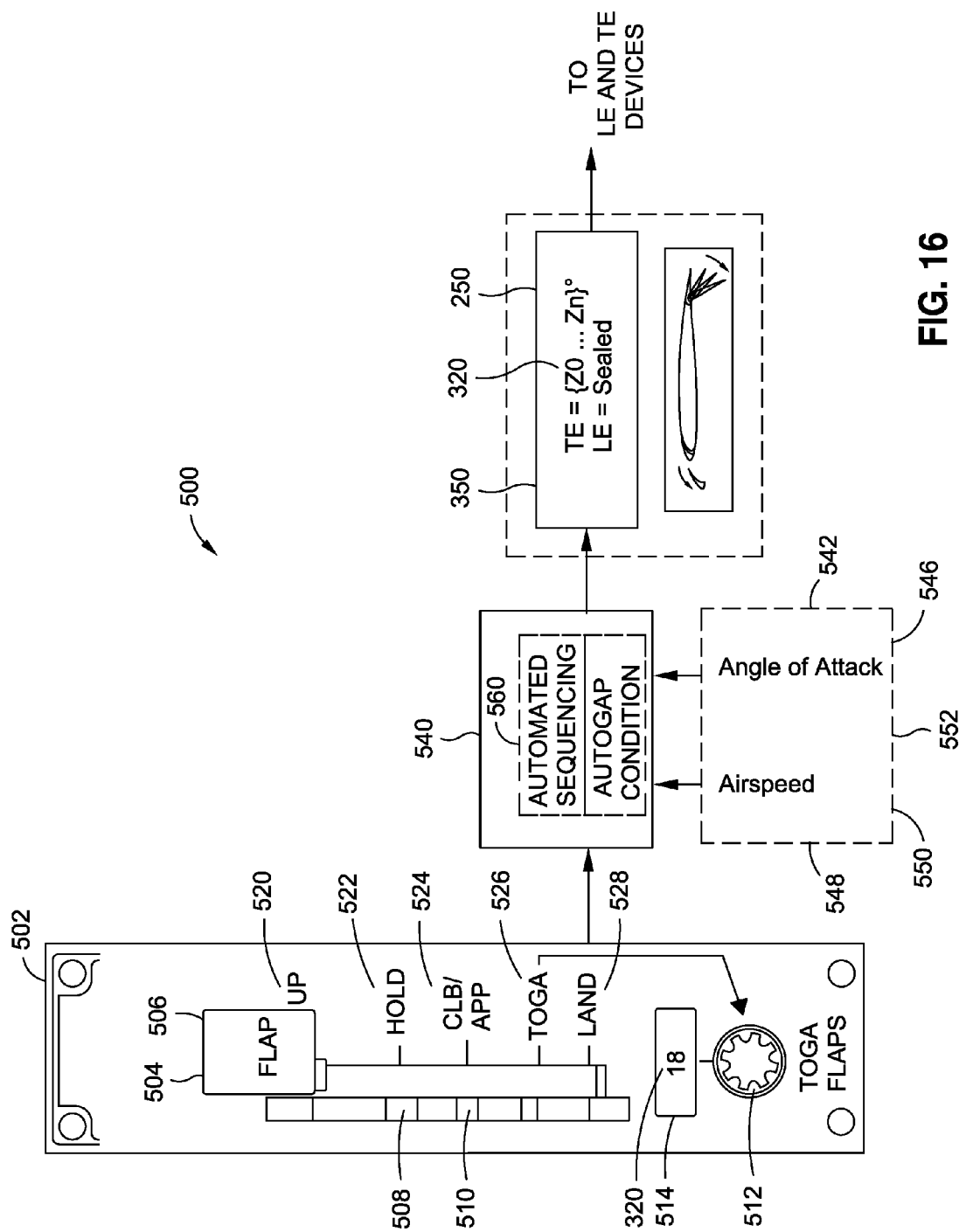
FIG. 16 is a diagrammatic view of an embodiment of the edge control system with the edge control device in the landing position for extending one or more trailing edge devices according to an extension sequence during landing and for determining an autogap condition for one or more leading edge devices.

Referring to FIG. 16, shown is an embodiment of the edge control system 500 with the edge control device 504 in a landing position 528 (e.g., a third control device position). The edge control device 504 may be operable to engage a third command mode for automatically extending a leading edge device to a gapped position 224 while the third command mode is engaged and at least one leading edge gap 226 condition occurs. In an embodiment, when the edge control device 504 is moved to the landing position 528, if the flight control computer 540 detects the occurrence of a leading edge gap 226 condition of the aircraft 100, the edge control device 504 may engage the third command mode causing the device actuation system 144 to automatically extend the leading edge device 200 to the gapped position 224. For example, when the aircraft 100 is descending on approach, the leading edge devices 200 such as the slats 202 may be initially maintained in a sealed position 222 to minimize aerodynamic noise that would otherwise be generated with the slats 202 in the gapped position 224. When the edge control device 504 is moved to the landing position 528, the slats 202 may be automatically extended to the gapped position 224 if the actual angle of attack 546 of the wings 116 relative to the airflow direction 136 exceeds a threshold angle of attack which may be pre-programmed into the flight control computer 540.

In FIG. 16, when the edge control device 504 is in the landing position 528, the flight control computer 540 may inhibit movement of the leading edge slats 202 from the sealed position 222 to the gapped position 224 as long as the actual radio altitude of the aircraft 100 exceeds a threshold radio altitude. The flight control computer 540 may generate a gap command when the actual angle of attack 546 of the wings 116 exceeds a threshold angle of attack regardless of the radio altitude of the aircraft 100. In addition, the flight control computer 540 may also generate a gap command when the aircraft 100 descends below the threshold radio altitude regardless of the angle of attack 546 of the wings 116. Upon generation of the gap command by the flight control computer 540, the edge control system 500 may automatically command the slat actuation system 250 to extend the leading edge slats 202 from the sealed position 222 to the gapped position 224. The flight control computer 540 may also generate a retract command to retract the leading edge slats 202 from the gapped position 224 to the sealed position 222 when the angle of attack to the wings 116 is less than the threshold angle of attack and/or the aircraft 100 ascends above the threshold radial altitude.

In FIG. 16, when the edge control device 504 is moved to the landing position 528, the edge control system 500 may also automatically command the flap actuation system 350 to extend the trailing edge devices 300 (e.g., flaps) according to an extension schedule. For example, the flight control computer 540 may continuously receive aircraft state data 542 such as forward airspeed, vertical speed, changes in engine thrust, spoiler (i.e., speedbrake) deployment, and other aircraft state data 542. The flight control computer 540 may determine the optimum flap settings 320 as a function of the aircraft state data 542. The optimum flap setting 320 may be such that aerodynamic noise and/or engine noise is minimized. The edge control system 500 may include flaps load relief capability allowing for temporarily and automatically retracting the flaps 302 when the aircraft 100 airspeed exceeds the flap placard speed, and allowing the flaps 302 to be automatically extended back to the optimum flap setting 320 when the aircraft 100 airspeed is less than the flap placard speed.

Figure 17:
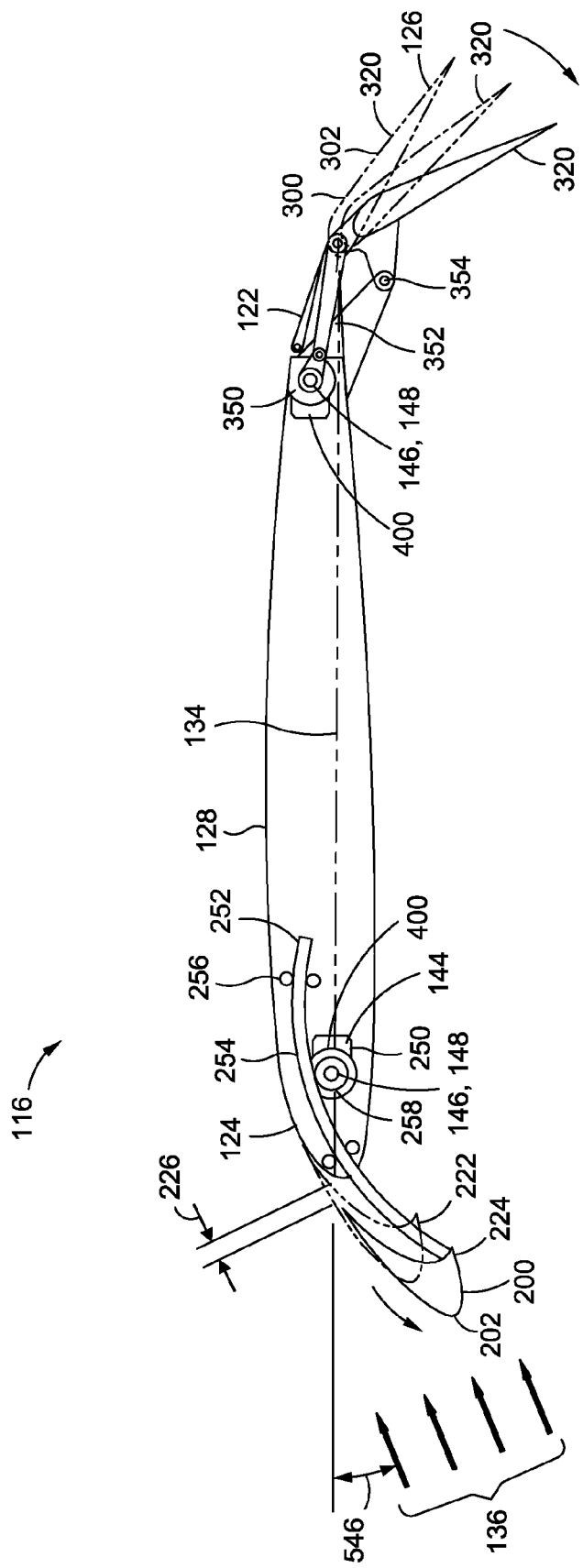
FIG. 17 is a sectional view of a wing illustrating the extension of a leading edge slat from a sealed position to a gapped position and the extending of a trailing edge flap according to an extension schedule when the edge control device is in the landing position.

Referring to FIG. 17, shown is a sectional view of a wing 116 illustrating the slat 202 extended from the sealed position 222 to the gapped position 224 in response to the actual angle of attack 546 of the wing exceeding a threshold angle of attack. With the leading edge slats 202 extended to the gapped position 224, wing camber may be increased which may improve the lift characteristics of the wing 116. In addition, when the leading edge slats 202 are in the gapped position 224, a gap 226 may be formed between the slats 202 and the wing leading edge 124 allowing air to flow through the gap 226 which many delay flow separation over the wing upper surface 128 at high angles of attack and thereby delay stall onset to improve stall performance. FIG. 13 illustrates the automated movement of the slats 202 (just before the 80-minute mark) from the sealed position 222 to the gapped position 224 in response to the aircraft 100 descending below a threshold radio altitude.

In FIG. 17, in a further embodiment, the edge control system 500 may automatically command the slat actuation system 250 to extend the outboard slats 206 to the gapped position 224 while initially maintaining the inboard slats 204 in the sealed position 222. The inboard slats 204 may be moved to the gapped position 224 after the outboard slats 206 reach the gapped position 224. By initially moving the outboard slats 206 to the gapped position 224 prior to the inboard slats 204, stall characteristics of the aircraft 100 may be improved due to the tendency of the reduced-camber inboard portion of the wing 116 to stall prior to the increased-camber outboard portion and causing the nose of the aircraft 100 to pitch down which may aid in stall recovery. FIG. 17 also illustrates the automated extension of the leading edge devices 200 (e.g., flaps) to progressively deeper flap settings until the flaps 302 are in the final landing flaps setting. As indicated above, the flight control computer 540 may determine an optimum flap setting 320 at each step in the extension sequence to minimize noise during deployment of the flaps 302. In addition, the automated extension of the flaps 302 may advantageously reduce the number of tasks required by the flight crew during approach.

Figure 18:
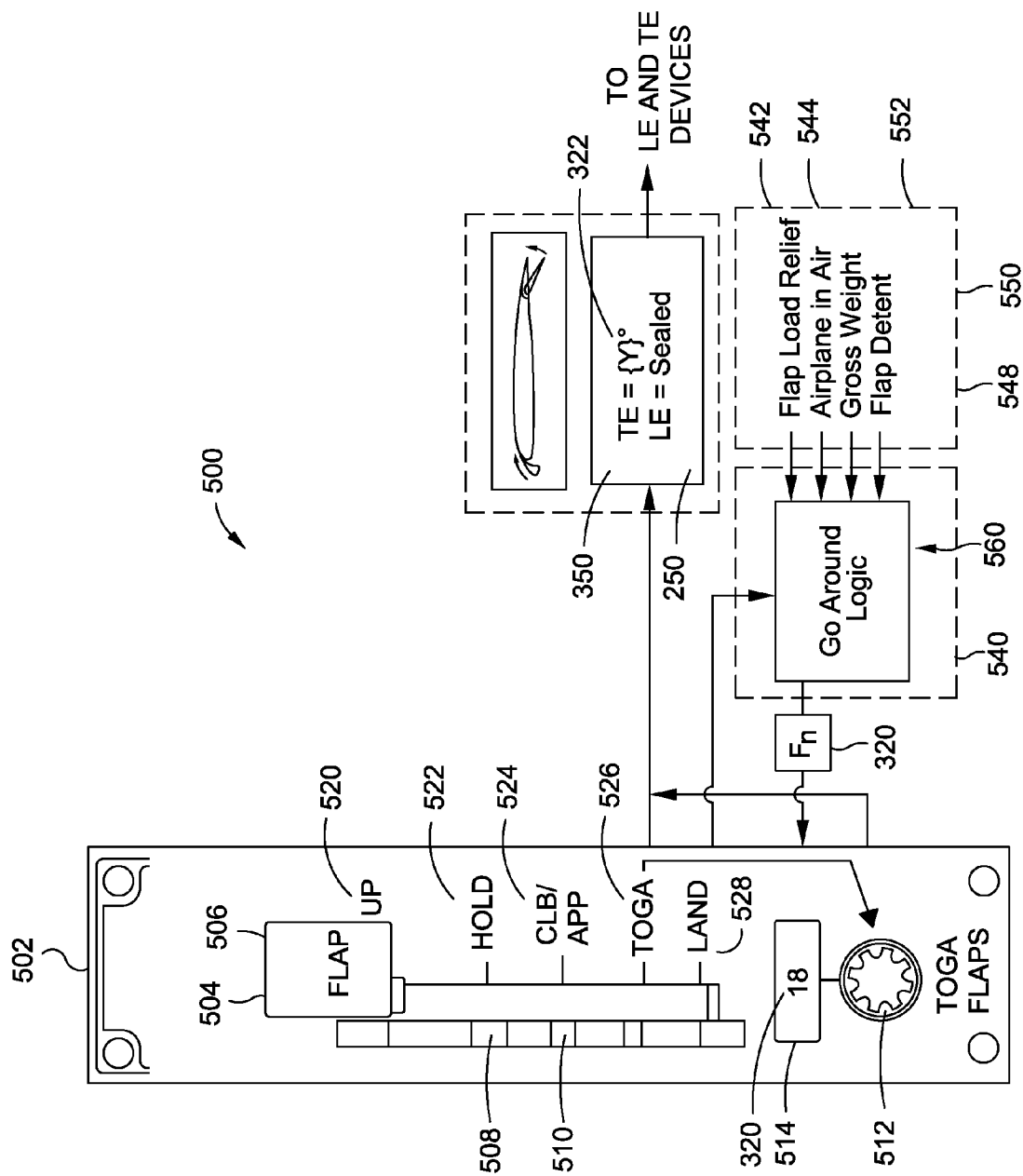
FIG. 18 is a diagrammatic view of an embodiment of the edge control system when the edge control device is moved from the landing position to the takeoff/go-around position for positioning one or more trailing edge devices at an optimized flap setting for an aircraft performing a go-around operation following an aborted landing.

Referring to FIG. 18, shown is an embodiment of the edge control system 500 illustrating the functionality thereof when the edge control device 504 is manually moved from the landing position 528 to the takeoff/go-around position 526 as may occur during initiation of a go-around operation in the event of an aborted landing. The flight control computer 540 may include go-around logic for computing an optimum flap setting 320 for the go-around operation when the edge control device 504 is in the landing position 528. The flight control computer 540 may continuously compute the optimum flap setting 320 based on aircraft state data 542 and/or airport information 548.

In FIG. 18, the aircraft state data 542 may include aircraft gross weight, aircraft center of gravity, flap detent setting, aircraft-in-air indication, and flaps load relief capability. In addition, the aircraft state data 542 may include the deflection angle increment that may be available for positioning the flaps 302, the maximum go-around thrust capability of the propulsion units 104, and other aircraft state data 542. The aircraft-in-air indication may provide an indication to the flight control computer 540 regarding whether the aircraft 100 is in the air or on the ground. The airport information 548 may include outside air temperature, barometric pressure, and other information that may affect the determination of the optimum flap setting 320. The optimum flap setting 320 may be displayed in the display window 514 whenever the edge control device 504 is in the landing flaps 302 position and/or the takeoff/go-around position 526.

In FIG. 18, the pilot may initiate a go-around operation by selecting a TOGA switch (not shown) on the thrust levers (not shown) causing the thrust levers to automatically advance to a go-around thrust setting (e.g., a maximum thrust setting). The pilot may retract the landing gear and manually move the edge control device 504 (e.g., flap lever 506) from the landing position 528 to a takeoff/go-around position 526 causing the trailing edge devices 300 (e.g. flaps) to automatically move to the optimum flap setting 320 as determined by the flight control computer 540. The aircraft 100 may climb to a predetermined altitude (e.g., 1,500 feet) and accelerate to a flaps-up maneuvering speed after which the aircraft 100 may perform another approach. In addition, when the edge control device 504 is manually moved from the landing position 528 to the takeoff/go-around position 526, the leading edge devices 200 (e.g., slats 202) may be automatically retracted from a gapped position 224 to a sealed position 222 to reduce aerodynamic drag and improve the climb performance of the aircraft 100 during the go-around operation.

In FIG. 18, the variable-trailing-edge-position switch 512 may allow the flight crew to manually adjust the position of the flaps 302 from the computed optimum flap setting 320 to a desired flap setting 322 that is different than the optimum flap setting 320. Alternatively, the flight control computer may be configured to automatically adjust the position of the flaps 302 to the desired flap setting 322. Advantageously, the variable-trailing-edge-position switch 512 may allow the flight crew to fine-tune the position of the flaps 302 prior to initiation of the go-around operation. For example, the pilot may change the flap setting from the optimum flap setting 320 to a desired flap setting 322 in consideration of obstacles or terrain that may be located in the area where the go-around operation will be performed. The variable-trailing-edge-position switch 512 may also allow the flight crew to manually adjust the flap setting as the go-around operation progresses.

Figure 19:
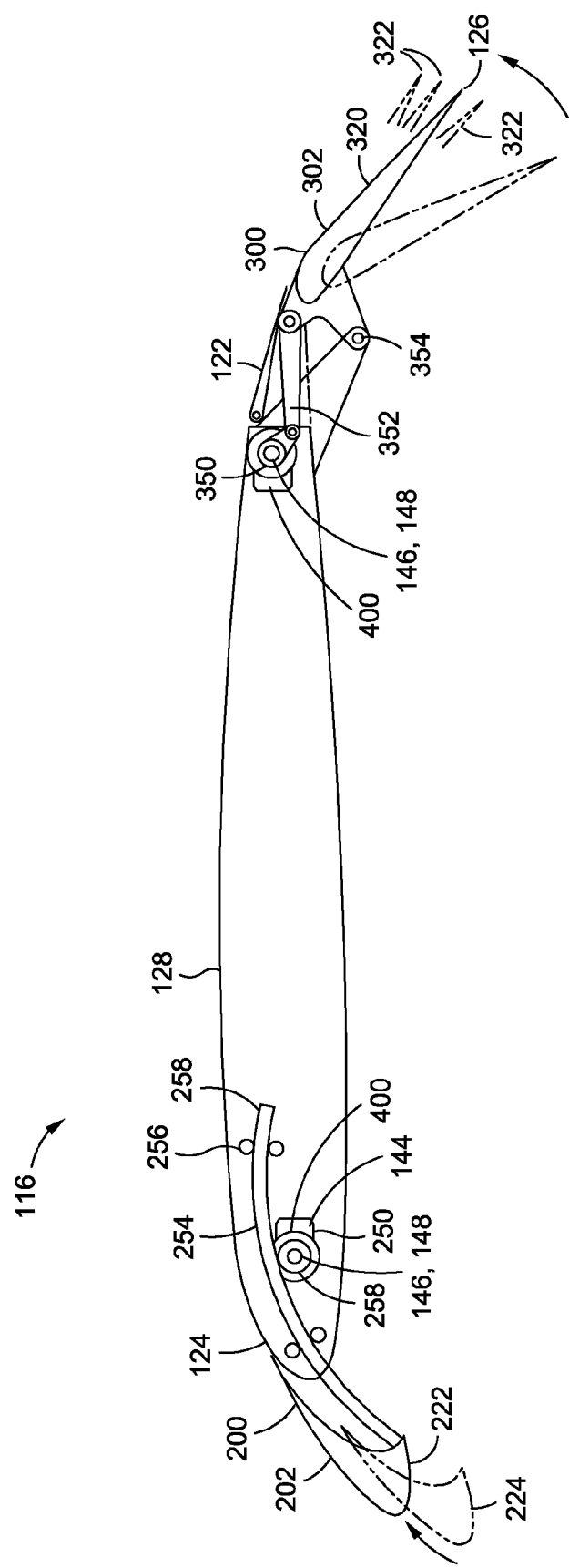
FIG. 19 is a sectional view of a wing illustrating the positioning of a trailing edge flap at the optimized flap setting for a go-around operation when the edge control device is moved from the landing position to the takeoff/go-around position.

Referring to FIG. 19, shown is a sectional view of a wing 116 illustrating the leading edge slat 202 automatically moved from the gapped position 224 to the sealed position 222 in response to the flight crew manually moving the edge control device 504 from the landing position 528 to the takeoff/go-around position 526. Also shown is the automatic retraction of the trailing edge flap 302 from the landing flaps 302 setting to the optimum flap setting 320 when the edge control device 504 is moved from the landing position 528 to the takeoff/go-around position 526. The optimum flap setting 320 may be different than a standard flap setting associated with a standard takeoff or go-around flap detent. For example, the optimum flap setting 320 may correspond to a flap deflection angle 316 of eighteen (18) degrees instead of a standard flap deflection angle 316 of twenty (20) degrees. The optimum flap setting 320 may advantageously optimize the climb performance of the aircraft 100 by allowing for a shallower flap setting resulting in reduced aerodynamic drag relative to the amount of aerodynamic drag generated by the flaps 302 in a standard flap deflection angle 316 for a go-around operation. In FIG. 19, also shown in phantom lines are optional desired flap settings 322 corresponding to flap deflection increments for positioning the flaps 302 using the variable-trailing-edge-position switch 512. By adjusting (e.g., rotating) the variable-trailing-edge-position switch 512, the flight crew may manually select a desired flap setting 322 which may be different than the optimum flap setting 320 computed by the flight control computer 540.

Figure 20:
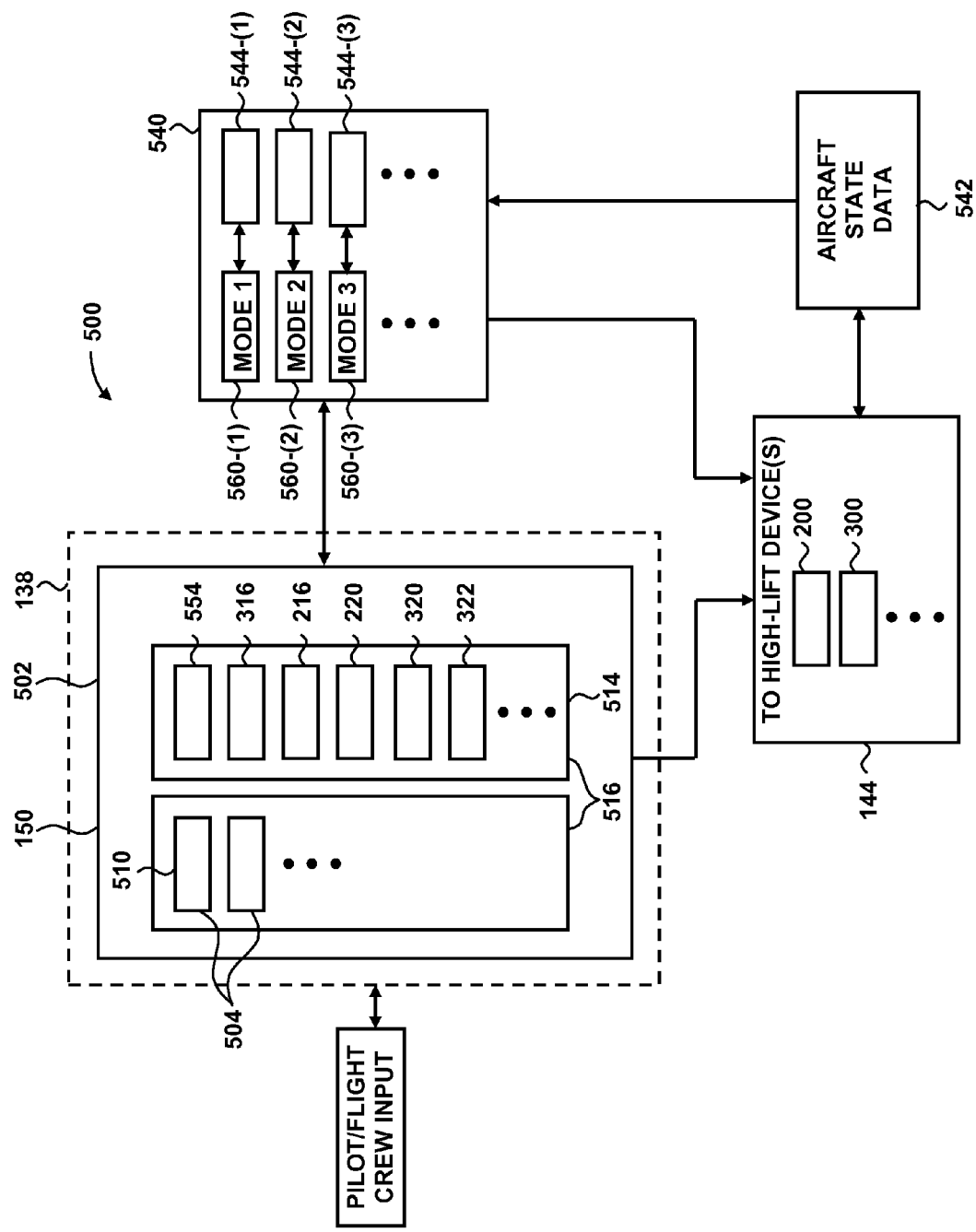
FIG. 20 is a block diagram illustrating an embodiment of the edge control system 500.

FIG. 20 shows a block diagram of a system 500 for controlling a high-lift device of an aircraft (e.g., leading edge devices 200 and trailing edge devices 300) according to some examples of the present disclosure. As described herein, the system 500 may include an interface 150, which may be located in the flight deck 138 of the aircraft 100. The interface 150 may be configured for receiving input from the flight crew and/or providing feedback to the flight crew. The interface 150 may be implemented as an edge control interface 502, for example as previously described with reference to FIGS. 2, 9, 11, 14, 16, and 18. The interface 150 may include an edge control device 504 operable to control a position of the high-lift device therewith. The edge control device 504 may be operable to select any of a plurality of control device positions 510, each of which is associated with a different flight phase 544 of the aircraft. The edge control device 504 may be operable to engage, in response to a selection of one of a plurality of control device positions 510, an automatic command mode for actuating the high-lift device in an automated manner based on the flight phase associated with the selected control device position.

The system 500 may further include a flight control computer 540 which may be operable in a plurality of command modes 560 (e.g., 560-(1), 560-(2), 560-(3), etc.). Each one of the command modes 560 may be associated with a given flight phase 540 (e.g., 544-(1), 544-(2), 544-(3), etc.). The edge control device 504 may be operable to engage a particular command mode 560 responsive to selecting a control device position 510 associated with the corresponding flight phase. The flight control computer 540 may be configured to receive aircraft state data 542 and may be further configured to compute a high-lift device setting for the high-lift device (e.g., an optimal flap setting 320, an optimal slat setting 220) based, at least in part, on the aircraft state data 542. The interface 150 and the flight control computer 540 may be communicatively coupled to one another and/or to an actuation system 144 which may be configured to actuate one or more of the high-lift devices of the aircraft. The actuation system 144 may be configured to automatically actuate the high-lift device to a computed high-lift device setting if a command mode is engaged.

For example, in a first command mode 560-(1), which may be a variable camber mode (e.g., FIG. 2) associated with a first control device position 544-(1) such as a cruise position 520 (e.g., FIG. 2) of the edge control device 504, the actuation system 144 may be configured to actuate the high-lift device in an upward direction and a downward direction relative to a retracted position. In some examples and as described above, the actuation system 144 may be configured to actuate the high-lift device in an upward direction and/or a downward direction in small increments, for example, and without limitation, in increments of up to approximately two (2) degrees. In further examples, the edge control device 504 may be operable to engage, in response to selection of a second control device position 544-(2) (e.g., a hold position 522—FIG. 9), a second command mode 560-(2) for automatically commanding a leading edge device 200 to a sealed position 222 upon engagement of the second command mode 560-(2).

In yet further examples, the edge control device 504 may be operable to engage, in response to a selection of a third control device position or a fourth control device position, respective third or fourth command modes 560 for automatically commanding the high-lift device(s) according to other control logic, as described herein. In some examples, the interface 150 may include a plurality of edge control devices e.g., a first edge control device 504, and a second edge control device which may be implemented as a switch 512 (FIG. 18). The second edge control device may be operable to override commands to the high-lift devices during a command mode, for example to allow the flight crew to select a desired setting for the high-lift device which may be different from the computed high-lift device setting without necessitating movement of the first edge control device 504 from the first control device position. The system 300, upon selection of a desired setting may be configured to command the high-lift device(s) to the desired setting.

The interface 150 may further include an indicator 516 configured to provide information about the high-lift device. The indicator 516 may be configured to indicate a position of the high-lift device. For example, the indicator 516 may be configured to indicate a computed high-lift device setting, a setting selected by the flight crew (e.g., a desired setting 322), a deflection angle of the high-lift device corresponding to either the computed setting or the desired setting, or combinations thereof. The indicator 516 may be integrated with or separate from the edge control device 502. As described herein, the control device 504 may be movable to a plurality of control device positions 510. In this regard, the control device 504 and control device position 510 selected thereby may function as an indicator of the position of the flap, which can be used instead of or in addition to one or more other indicators of the interface 150. In some examples, the indicator 516 may be a display 514 (see FIG. 18) or other device for communicating information about the high-lift device to the pilot (e.g., when the high-lift device is automatically commanded by the system 300). Virtually any information about the high-lift devices may be displayed in the display 514, for example the slat and/or flap deflection angle 216, 316, the optimum slat and/or flap setting, 220, 320, the desired setting 322, a status 554 of the slats (e.g., sealed or gapped), or combinations thereof.

Figure 21B:
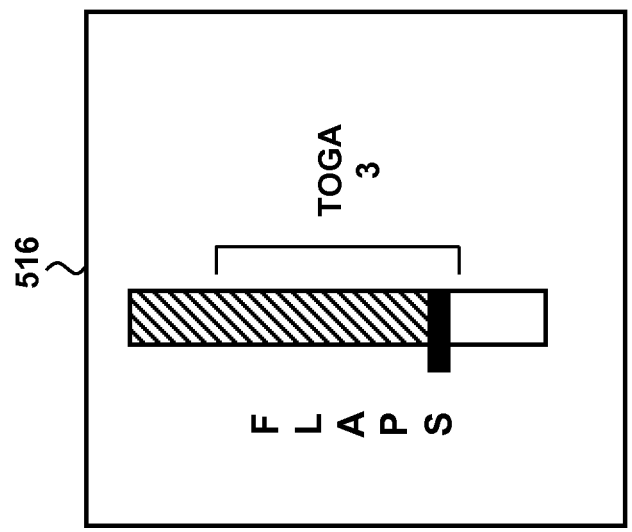
FIGS. 21A-21B are illustrations of an embodiment of an indicator for indicating a position of a high-lift device.
Figure 21A:
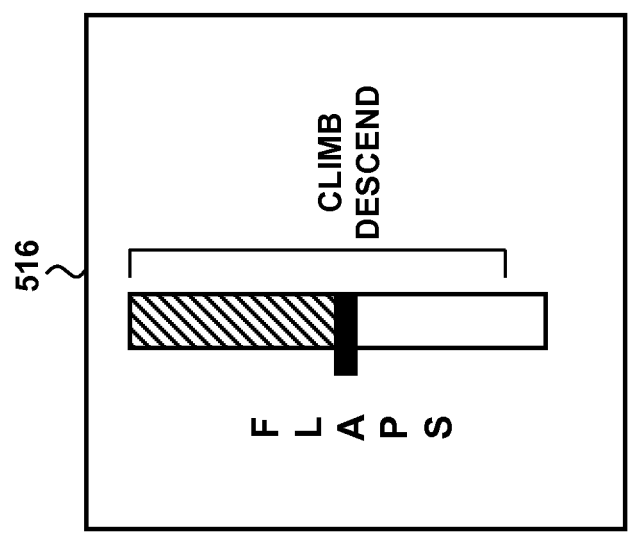

In some examples, the indicator 516 may be implemented as a fill-type indicator (e.g., a tape indicator similar to an airspeed tape), for example as shown in FIGS. 21A-21B. FIG. 21A shows an example of a fill-type indicator 150 indicating CLIMB-DESCEND to indicate that the trailing edge devices 300 (e.g., flaps 302) are in a climb setting or approach setting. The fill-type indicator 150 may include a vertical gage representing maximum available flap deflection and may additionally including a horizontal bar that may be vertically movable along the vertical gage. The vertical position of the horizontal bar on the vertical gage may indicate the actual flap deflection angle of the flaps or a percentage of maximum flap deflection. FIG. 21B shows the fill-type indicator 150 indicating TOGA 3 to indicate that the trailing edge devices 300 (e.g., flaps 302) are in a takeoff or go-around setting and further showing the horizontal bar in a vertically lower position than in FIG. 21A to indicate a deeper flap setting corresponding to the takeoff or go-around setting. Other fill-type indicators may be used. For example, the indicator 516 may be implemented as a gage indicator in which the full gage corresponds to the full extension of flaps available (e.g., maximum flap deflection) and the actual flap deflection angle or a percentage of maximum flap deflection may be displayed in a corresponding position in the gage. In further examples, the indicator 516 may be one of a plurality of fill-type indicators including at least one indicator for displaying information relating to a leading edge device of the aircraft and at least one indicator for displaying information relating to a trailing edge device of the aircraft. Virtually any information about the high-lift devices may be displayed.

Figure 22:
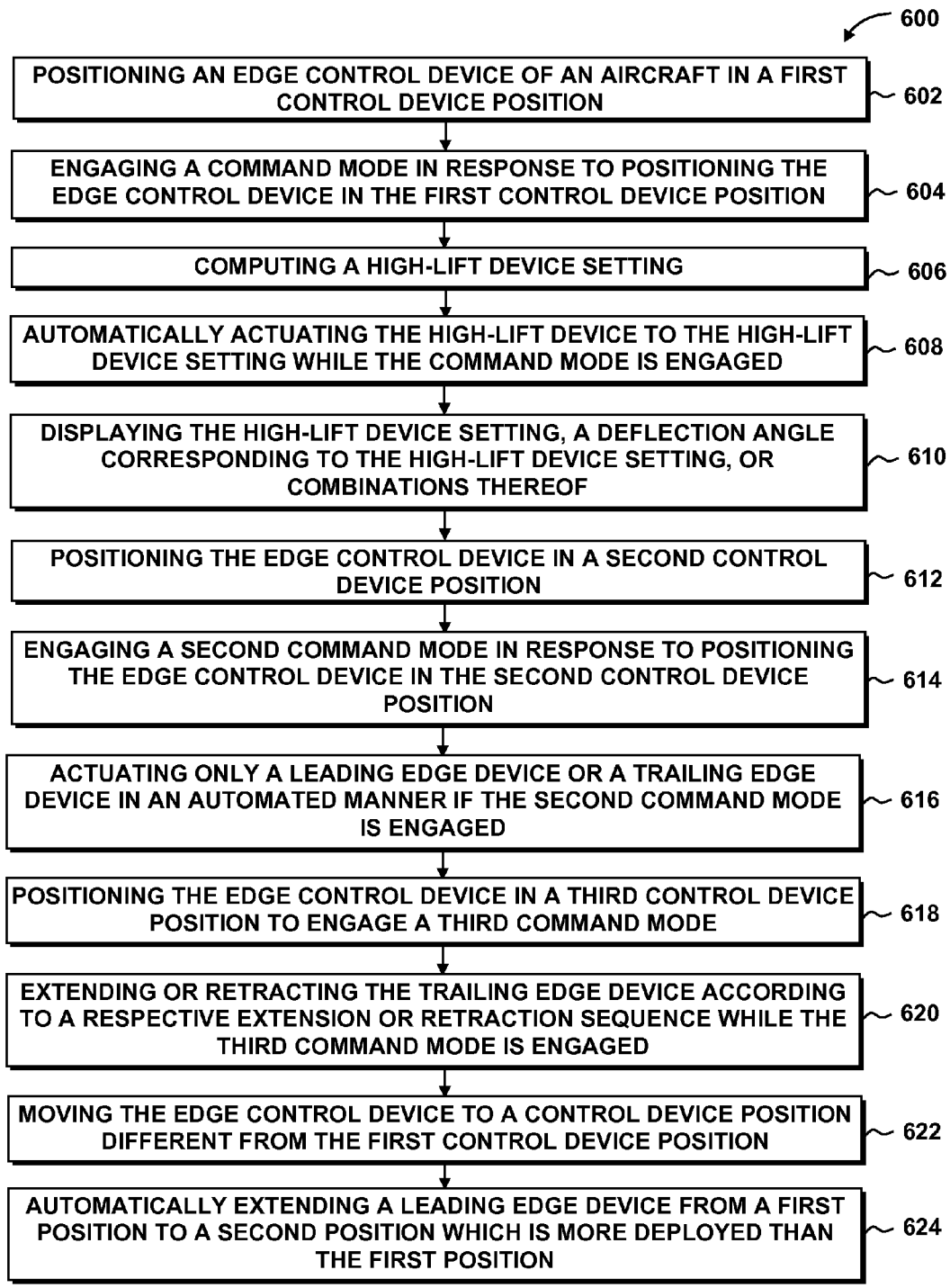
FIG. 22 is a flow chart illustrating one or more operations that may be included in a method of operating high-lift devices of an aircraft.
Figure 23:
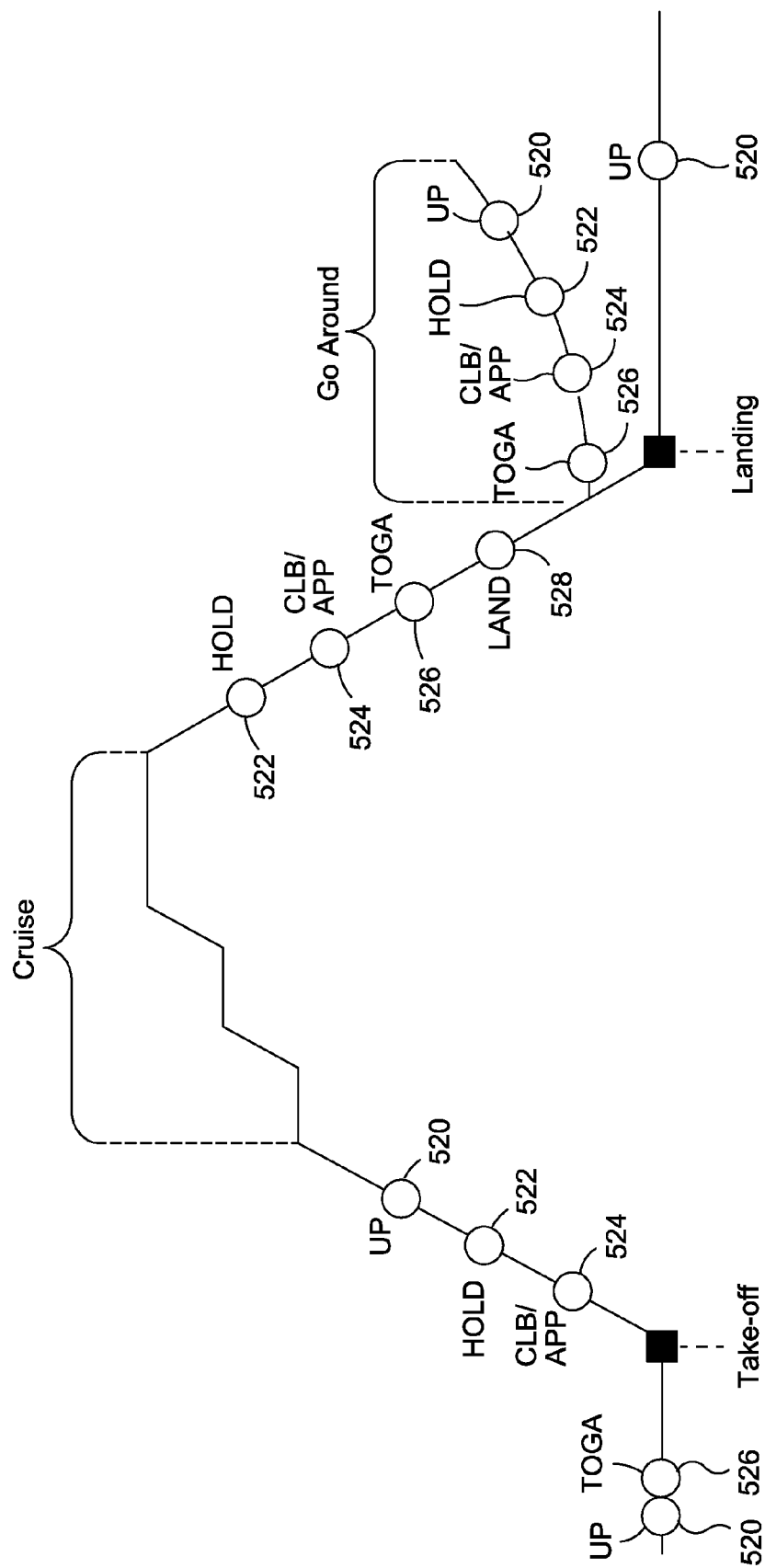
FIG. 23 illustrates a flight profile of an aircraft and the positioning of the edge control device (e.g., flap control lever) during different flight phases.

Referring to FIGS. 22-23, shown in FIG. 22 is a flow chart illustrating one or more operations that may be included in a method 600 of operating high-lift devices such as leading edge devices 200 and/or trailing edge devices 300 of an aircraft 100. FIG. 23 illustrates a flight profile of an aircraft 100 and the different control device positions 510 corresponding to different flight phases 544 during an aircraft mission.

Step 602 of the method 600 of FIG. 22 may include positioning an edge control device 504 in a first control device position of a plurality of control device positions 510. As indicated above, each of the plurality of control device positions 510 may be associated with a flight phase 544 (FIG. 20) of the aircraft 100. In an embodiment, the method may include moving the edge control device 504 to a cruise position 520 (UP) when the aircraft 100 is in a cruise phase (FIG. 23). For example, the edge control device 504 may be moved to the cruise position 520 before or when the aircraft 100 reaches a cruising altitude.

Step 604 of the method 600 of FIG. 22 may include engaging a command mode in response to positioning the edge control device 504 in the first control device position. Engagement of the automatic command mode may cause actuation of the high-lift device in an automated manner based on the flight phase 544 associated with the selected control device position 510. As shown in FIG. 20, each one of the command modes 560 (e.g., 560-(1), 560-(2), 560-(3), etc.) may be associated with a corresponding flight phase 540 (e.g., 544-(1), 544-(2), 544-(3), etc.).

Step 606 of the method 600 of FIG. 22 may include computing a high-lift device setting for a high-lift device. In an embodiment, the flight control computer 540 may be configured to compute a high-lift device setting based, at least in part, on the aircraft state data 542. The aircraft state data 542 may include aircraft gross weight, aircraft center of gravity, aircraft angle of attack, Mach number, altitude, and/or other aircraft parameters or combinations thereof. The flight control computer 540 may be preprogrammed with the aircraft state data 542 and/or the aircraft state data 542 may be periodically or continuously provided to the flight control computer 540. The flight control computer 540 may compute the high-lift device setting as an optimum flap setting 320 and/or an optimum slat setting based, at least in part, on the aircraft state data 542.

Step 608 of the method 600 of FIG. 22 may include automatically actuating the high-lift device to the high-lift device setting while the command mode is engaged. For example, the method may include automatically actuating a leading edge device 200 and/or a trailing edge device 300 to a corresponding high-lift device setting, when the command mode is engaged. In some embodiments, the system 500 may include a first edge control device (e.g., a flap lever 506—FIG. 18) and a second edge control device (e.g., a switch 512—FIG. 18). The method may also include using the second edge control device to command the high-lift device to a second high-lift device setting different from the computed high-lift device setting while the first edge control device (e.g., flap lever 506) remains in the first control device position. The method may include actuating the high-lift device to the second high-lift device setting. In this regard, the second edge control device may allow the flight crew to fine tune or adjust the computed high-lift device setting to a different high-lift device setting.

In some examples where the first control device position is a cruise position 520, and the high-lift device includes a leading edge device 200, a trailing edge device 300, or both, the method may include automatically actuating the leading edge device 200, the trailing edge device 300, or both in an upward direction and a downward direction relative to a retracted position 208, 308 when the command mode (e.g., a first command mode) is engaged. In this regard, the method may include automatically actuating one or more of the leading edge devices 200 and/or one or more of the trailing edge devices 300 in a variable camber mode when the edge control device 504 is in the cruise position 520. For example, in the variable camber mode, the slats 202 and/or the flaps 302 may be actuated to their respective optimum slat setting 220 and optimum flap setting 320 in an upward direction 210, 310 and a downward direction 212, 312 relative to a retracted position 208, 308 and within the limits of the above-described slat deflection angle 216 and flap deflection angle 316 as shown in FIG. 5. The edge control system 500 may periodically (e.g., every five minutes, etc.) reposition the slats 202 and flaps 302 to surface deflection angles that may be optimized with regard to aircraft gross weight, aircraft center of gravity, altitude, Mach number, and/or other aircraft state data 542, as shown in FIG. 8.

The method may include varying the wing 116 camber in response to actuating the leading edge devices 200 and the trailing edge devices 300 to their optimum deflection angles in the upward direction 210, 310 and the downward direction 212, 312 to minimize aerodynamic drag. In some example, the inboard devices 140 and outboard devices 142 may be differentially deployed as shown in FIGS. 6-7 to vary the wing 116 camber along a spanwise direction of the wings 116. The leading edge devices 200 and the trailing edge devices 300 may be automatically actuated according to weight-CG-altitude-airspeed scheduled surface deflection angles to vary the wing camber along a chordwise direction and/or along a spanwise direction to minimize aerodynamic drag and/or to optimize spanwise load distribution to minimize wing bending at the wing root 130 which may allow for a reduction in the sizing of the wing structure.

Step 610 of the method 600 of FIG. 22 may include displaying, in the flight deck 138 of the aircraft 100, the high-lift device setting, a deflection angle corresponding to the high-lift device setting, or combinations thereof. In some examples, the aircraft 100 may include an indicator 516 (e.g., see FIG. 20) configured to indicate the computed high-lift device setting, a desired setting, a deflection angle of the high-lift device corresponding to either the computed high-lift device setting or the desired setting, or combinations thereof. The indicator 516 may display information about the high-lift device to the flight crew when the high-lift device is automatically commanded by the system 300. For example, the indicator 516 may display the actual flap deflection angle or a percentage of maximum flap deflection as shown in FIGS. 21A-21B.

Step 612 of the method 600 of FIG. 22 may include positioning the edge control device 504 in a second control device position. For example, the method may include moving the edge control device 504 from a cruise position 520 (e.g., a first control device position) to a hold position 522 (e.g., a second control device position). The first control device position may correspond to a first command mode as described above. Step 614 of the method 600 of FIG. 22 may include engaging a second command mode in response to positioning the edge control device in the second control device position. The first command mode and the second command mode may each be associated with a different flight phase of the aircraft.

Step 616 of the method 600 of FIG. 22 may include actuating only a leading edge device 200 or a trailing edge device 300 in an automated manner if the second command mode is engaged. For example, where the second control device position is a hold position 522, the method may include commanding the leading edge device 200 from a refracted position 208 to a sealed position 222 in response to moving the edge control device 504 to the hold position 522. The trailing edge device 300 may be maintained in a retracted position 308 when the second command mode is engaged. For example, during initial descent from a cruising altitude as shown in FIG. 23, the flight crew may be instructed by air traffic control to maintain a specified altitude in a holding pattern above a destination airport prior to landing. In response to the instructions, the flight crew may move the edge control device 504 from the cruise position 520 to the hold position 522. In response to moving the edge control device 504 to the hold position 522, the leading edge devices 200 may be automatically commanded to a sealed position 222, and the trailing edge devices 300 may be maintained in a retracted position 308. For example, the inboard and outboard slats 204, 206 may be moved from their respective optimum slat settings 220 (e.g. from the variable camber mode) to the sealed position 222 which may allow the aircraft 100 to maintain altitude at a reduced thrust setting resulting in reduced fuel consumption while the aircraft 100 is in the holding pattern.

Step 618 of the method 600 of FIG. 22 may include positioning the edge control device in a third control device position to engage a third command mode. In some examples, the edge control device 504 (e.g., a flap lever 506) may be moved to a climb/approach position 524 (CLB/APP). For example, during the descent of the aircraft 100 (FIG. 23), the flight crew may move the edge control device 504 from the hold position 522 (HOLD) to the climb/approach position 524 (CLB/APP). Alternatively, the flight crew may move the edge control device 504 from the cruise position 520 (UP) directly to the climb/approach position 524 (CLB/APP) and may skip the hold position 522 (HOLD) to minimize the number of crew-commanded flap lever movements during an approach.

Step 620 of the method may include actuating a trailing edge device according to an extension sequence or a retraction sequence in response to engaging the third command mode. For example, the method may include extending the trailing edge device 300 according to an extension sequence when the third command mode corresponds to an approach phase or a landing phase of the aircraft 100. The method may include retracting the trailing edge device 300 according to a retraction sequence when the third command mode corresponds to a climb phase. The leading edge devices 200 may be maintained in the sealed position 222 when the edge control device 504 is moved to the climb/approach position 524 which may reduce the amount of community noise (i.e., noise perceived on the ground) generated by the aircraft relative to the amount of noise generated when the leading edge devices 200 are in the gapped position 224. The trailing edge devices 300 may be actuated according to an extension sequence or a retraction sequence when the edge control device 504 is moved to the climb/approach position 524 (CLB/APP). For example, when the aircraft 100 is descending during an approach phase (FIG. 23), the method may include automatically extending the trailing edge devices 300 according to an extension sequence (see FIG. 13). When the aircraft 100 is climbing such as after takeoff or during a go-around operation, the method may include automatically retracting the trailing edge device 300 according to a retraction sequence when the edge control device 504 is in the climb/approach position 524.

In some embodiments, the method may include moving the edge control device 504 to a takeoff/go-around position 526 (TOGA). For example, during descent of the aircraft 100, the flight crew may move the edge control device 504 from the climb/approach position 524 (CLB/APP) to the takeoff/go-around position 526 (TOGA). The method may include computing an optimum flap setting 320 using the flight control computer 540 based on the above-mentioned aircraft state data 542 which may be continuously provided to the flight control computer 540. The trailing edge device 300 may be positioned at the optimum flap setting 320 in response to moving the edge control device 504 to the takeoff/go-around position 526. In a further embodiment, the method may include changing the optimum flap setting 320 by selecting a desired flap setting 322 using the second edge control device (e.g., a switch 512—FIG. 18) as described above. For example, an optimum flap setting 320 of twenty (20) degrees may be changed to a desired flap setting 322 of eighteen (18) degrees by rotating the variable-trailing-edge-position switch 512 until the desired flap setting 322 appears in the display window 514 (FIG. 14). The desired flap setting 322 may be selected before or after moving the edge control device 504 to the takeoff/go-around position 526. Movement of the trailing edge device 300 to the desired flap setting may require that the edge control device 504 is in the takeoff/go-around position 526.

In some embodiments, the method may include moving the edge control device 504 to the landing position 528 (LAND). For example, during final approach of the aircraft 100, the flight crew may move the edge control device 504 from the takeoff/go-around position 526 (TOGA) to the landing position 528 (LAND). Alternatively, the flight crew may move the edge control device 504 from the climb/approach position 524 (CLB/APP) directly to the landing position 528 and may skip the takeoff/go-around position 526 to minimize the number of crew-commanded flap lever movements. In some embodiment when the edge control device 504 is moved to the landing position 528 (e.g., FIG. 13), the method may include gradually extending the trailing edge devices 300 to the final landing flaps setting according to an extension schedule. The flight control computer 540 may continuously receive aircraft state data 542 such as forward airspeed, vertical speed, changes in engine thrust, spoiler (i.e., speedbrake) deployment, and other aircraft state data 542. The flight control computer 540 may compute an optimum flap setting 320 at each step in the flap 302 extension sequence as a function of the aircraft state data 542 such as airspeed, aircraft gross weight, aircraft center of gravity, outside air temperature, and other data. The flight control computer 540 may compute optimum flap settings 320 to minimize aerodynamic noise from the flaps 302 and/or minimize engine noise due to reduced thrust settings as a result of reduced aerodynamic drag generated by the flaps 302 at the optimum flap settings 320.

Step 622 of the method 600 of FIG. 22 may include moving the edge control device 504 to a control device position different from the first control device position. In some examples, the edge control device (e.g., flap lever 506) may be moved to the landing position 528 (LAND). Step 624 of the method 600 of FIG. 22 may include automatically extending a leading edge device 300 from a first position to a second position which is more deployed than the first position in response to detection of one or more conditions. For example, the leading edge device may be automatically extended if a radio altitude of the aircraft 100 is less than a threshold radio altitude and/or if an actual angle of attack 546 of a wing 116 of the aircraft is greater than a threshold angle of attack. In an embodiment, the leading edge devices 200 may be extended from the sealed position 222 to the gapped position 224 upon detection of at least one of two above-mentioned autogap conditions. The flight control computer 540 may initially inhibit movement of the leading edge devices 200 to the gapped position 224 when the edge control device 504 is initially moved to the landing position 528 (LAND) as a means to minimize community noise when the aircraft 100 is at a low altitude during final approach.

The method may include detecting the autogap condition and generating a gap command using the flight control computer 540 when the actual angle of attack 546 of the wings 116 exceeds a threshold angle of attack causing the leading edge devices 200 to automatically move from the sealed position 222 to the gapped position 224. In the gapped position 224, air may flow through the gap 226 between the wing 116 and the leading edge device 200 allowing the airflow to remain attached to the wing upper surface 128 at high angles of attack which may delay stalling. Below a threshold radio altitude, the flight control computer 540 may also detect an autogap condition and generate a gap command causing the leading edge devices 200 to automatically extend to the gapped position 224 to provide a stable landing configuration for the aircraft 100.

The method may additionally include moving the edge control device 504 from the landing position 528 (LAND) to the takeoff/go-around position 526 (TOGA) as shown in FIG. 23. The edge control device 504 may be moved to the takeoff/go-around position 526 as part of the procedure for initiating a go-around operation in the event that a landing is aborted. Prior to moving the edge control device 504 from the landing position 528 to the takeoff/go-around position 526, the flight control computer 540 may compute an optimum flap setting 320 for the go-around operation based on aircraft state data 542 as indicated above. The method may also include moving the trailing edge devices 300 to an optimum flap setting 320 for the go-around operation in response to moving the edge control device 504 to the takeoff/go-around position 526. For example, prior to touchdown of the aircraft 100, the trailing edge flaps 302 may be retracted from the final landing flap setting to the optimum flap setting 320 to reduce aerodynamic drag. The reduction in aerodynamic drag may improve the climb rate of the aircraft 100 during the go-around operation. The flight crew may also adjust the optimum flap setting 320 to a desired flap setting 322 using the variable-trailing-edge-position switch 512 as the go-around operation progresses. Alternatively, the flight control computer 540 may be configured to automatically adjust the flaps 302 to the optimum flap setting 320 computed by the flight control computer 540.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for controlling a high-lift device of an aircraft, comprising;
   an interface for placement in a flight deck of an aircraft and including an edge control device for controlling a position of a trailing edge device of the aircraft and operable to select any of a plurality of control device positions including a climb/approach position, each one of the plurality of control device positions corresponding to a different standard device setting, each one of the plurality of control device positions corresponding to a different flight phase of the aircraft including a climb phase;
   a flight control computer communicatively coupled to the interface and configured to compute an optimum device setting for the trailing edge device based on aircraft state data, the optimum device setting including a setting that is different than a standard device setting associated with a control device position;
   the edge control device operable to engage, in response to a selection of the climb/approach position, a command mode for actuating the high-lift device in an automated manner based on the climb phase associated with the climb/approach position of the edge control device; and
   a device actuation system communicatively coupled to the flight control computer and operatively coupled to the trailing edge device and configured to automatically and gradually retract the trailing edge device according to a flap retraction sequence when the edge control device is moved to the climb/approach position, the device actuation system configured to move the trailing edge device to an optimum flap setting at each step in the flap retraction sequence, the optimum flap setting at each step being computed by the flight control computer based upon the continuously monitored aircraft state data including angle-of-attack, aircraft gross weight, airspeed, and acceleration.

2. The system of claim 1, wherein:
   the edge control device is positionable in at least one of the following control device positions: a cruise position, a hold position, the climb/approach position, a takeoff/go-around position, a landing position.

3. The system of claim 1, wherein:
   the aircraft includes a leading edge device; and
   the device actuation system configured to actuate the high-lift device in an upward direction and a downward direction relative to a retracted position.

4. The system of claim 1, wherein:
   the edge control device is operable to engage, in response to a selection of a second control device position, a second command mode for automatically commanding a leading edge device to a sealed position upon engagement of the second command mode.

5. The system of claim 2, wherein:
   the interface is configured to command the device actuation system to extend the trailing edge device according to an extension sequence if the edge control device is moved to the climb/approach position or the landing position.

6. The system of claim 1, wherein the edge control device is a first edge control device, the interface further including:
   a second edge control device operable to select a desired setting for the high-lift device different from the computed optimum device setting.

7. The system of claim 1, wherein:
the edge control device is operable to engage, in response to a selection of a third control device position, a third command mode for automatically extending a leading edge device to a gapped position while the third command mode is engaged and at least one of the following conditions is met: a radio altitude of the aircraft is below a threshold radio altitude, an actual angle of attack exceeds a threshold angle of attack.

8. The system of claim 6, wherein the interface further comprises:
an indicator configured to indicate the computed optimum device setting, the desired setting, a deflection angle of the high-lift device corresponding to either the computed optimum device setting or the desired setting, or combinations thereof.

9. The system of claim 8, wherein:
the indicator is a fill indicator for displaying the deflection angle of the high-lift device, the setting for the high-lift device, or combinations thereof.

10. The system of claim 8, wherein:
the indicator is one of a plurality of fill indicators including at least one indicator for displaying information relating to a leading edge device and at least one indicator for displaying information relating to a trailing edge device.

11. An aircraft, comprising:
a wing including a trailing edge device;
an edge control system including an edge control device positionable in one of a plurality of control device positions including a climb/approach position, each one of the control device positions corresponding to a different standard device setting, each one of the control device positions corresponding to a flight phase of an aircraft including a climb phase;
a flight control computer communicatively coupled to the edge control system and configured to compute an optimum device setting for the trailing edge device based on aircraft state data, the optimum device setting including a setting that is different than a standard device setting associated with a control device position; and
the edge control system configured to command, in response to selection of the climb/approach position, a device actuation system communicatively coupled to the flight control computer and operatively coupled to the trailing edge device and configured to automatically and gradually retract the trailing edge device according to a flap retraction sequence when the edge control device is moved to the climb/approach position, the device actuation system configured to move the trailing edge device to an optimum flap setting at each step in the flap retraction sequence, the optimum flap setting at each step being computed by the flight control computer based upon the continuously monitored aircraft state data including angle-of-attack, aircraft gross weight, airspeed, and acceleration.

12. A method of operating one or more high-lift devices of an aircraft, the method comprising:
positioning an edge control device of an aircraft in a climb/approach position, the climb/approach position being one of a plurality of control device positions each corresponding to a different standard device setting, each of the plurality of control device positions associated with a flight phase of the aircraft including a climb phase;
engaging a command mode in response to the positioning of the edge control device in the climb/approach position;
computing, using a flight control computer, optimum device settings for a high-lift device configured as a trailing edge device based on aircraft state data, the optimum device settings being different than a standard device setting associated with a control device position; and
automatically and gradually retracting, using a device actuation system communicatively coupled to the flight control computer, the trailing edge device according to a flap retraction sequence when the edge control device is moved to the climb/approach position, the device actuation system moving the trailing edge device to an optimum flap setting at each step in the flap retraction sequence, the optimum flap setting at each step being computed by the flight control computer based upon the continuously monitored aircraft state data including angle-of-attack, aircraft gross weight, airspeed, and acceleration.

13. The method of claim 12, wherein the edge control device position is positionable in a cruise position, and wherein the one or more high-lift devices include a leading edge device, the trailing edge device, or both, the method further comprising:
actuating the leading edge device, the trailing edge device, or both in an upward direction and a downward direction relative to a retracted position.

14. The method of claim 12, further comprising:
displaying, in a flight deck of the aircraft, the optimum device settings, a deflection angle corresponding to the optimum device settings, or combinations thereof.

15. The method of claim 12, wherein the command mode is a first command mode, the method further comprising:
engaging a second command mode in response to positioning the edge control device in a second control device position; and
actuating only a leading edge device or a trailing edge device in an automated manner if the second command mode is engaged.

16. The method of claim 15, wherein the second control device position is a hold position, the method further comprising:
commanding a leading edge device to a sealed position in response to moving the edge control device to the hold position.

17. The method of claim 12, further comprising:
positioning the edge control device in a landing position; and
extending the trailing edge device according to an extension sequence in response to positioning the edge control device in the landing position.

18. The method of claim 12, wherein the edge control device is a first edge control device, the method further comprising:
using a second edge control device, commanding one or more of the high-lift devices to a second high-lift device setting different from the computed optimum device setting while the first edge control device remains in a first control device position; and
actuating one or more of the high-lift devices to the second high-lift device setting.

19. The method of claim 12, further comprising:
automatically extending a leading edge device from a first position to a second position which is more deployed than the first position in response to detection of one or more of the following conditions:
a radio altitude of the aircraft being less than a threshold radio altitude; and
an angle of attack of a wing of the aircraft being greater than a threshold angle of attack.

\* \* \* \* \*